United States Patent
Lee et al.

(10) Patent No.: US 8,897,219 B2
(45) Date of Patent: Nov. 25, 2014

(54) METHOD AND USER EQUIPMENT FOR TRANSMITTING RANGING SIGNAL, AND METHOD AND BASE STATION FOR RECEIVING RANGING SIGNAL

(75) Inventors: Hyunwoo Lee, Anyang-si (KR); Hangyu Cho, Anyang-si (KR); Jinsam Kwak, Anyang-si (KR); Jinyoung Chun, Anyang-si (KR); Jinsoo Choi, Anyang-si (JP)

(73) Assignee: LG Electronics Inc., Seoul (KR)

( * ) Notice: Subject to any disclaimer, the term of this patent is extended or adjusted under 35 U.S.C. 154(b) by 540 days.

(21) Appl. No.: 13/198,662

(22) Filed: Aug. 4, 2011

(65) Prior Publication Data

US 2012/0039272 A1 Feb. 16, 2012

Related U.S. Application Data

(60) Provisional application No. 61/374,270, filed on Aug. 17, 2010, provisional application No. 61/373,281, filed on Aug. 13, 2010.

(30) Foreign Application Priority Data

Mar. 31, 2011 (KR) .................. 10-2011-0029916

(51) Int. Cl.
*H04W 4/00* (2009.01)
*H04W 72/04* (2009.01)
*H04W 48/16* (2009.01)

(52) U.S. Cl.
CPC .............. *H04W 72/04* (2013.01); *H04W 48/16* (2013.01)
USPC ........... 370/328; 370/208; 370/210; 455/447

(58) Field of Classification Search
None
See application file for complete search history.

(56) References Cited

U.S. PATENT DOCUMENTS

| 7,706,804 | B2 * | 4/2010 | Huh et al. ................. | 455/450 |
| 7,873,026 | B2 * | 1/2011 | Cho et al. ................. | 370/350 |
| 8,121,143 | B2 * | 2/2012 | Jung ....................... | 370/444 |
| 8,364,206 | B2 * | 1/2013 | Takatani et al. ........... | 455/562.1 |
| 8,462,726 | B2 * | 6/2013 | Park et al. ................ | 370/330 |
| 8,576,783 | B2 * | 11/2013 | Huh et al. ................ | 370/329 |

(Continued)

FOREIGN PATENT DOCUMENTS

| CN | 101420268 | 4/2009 |
| JP | 2006-254461 | 9/2006 |

(Continued)

OTHER PUBLICATIONS

Intel Corp., et al., "IEEE 802.16m System Description Document (SDD)," IEEE 802.16 Broadband Wireless Access Working Group, IEEE 802.16m-09/0034, Jul. 2009, 161 pages (relevant sections: p. 80-91, 99-106, 147-153).

(Continued)

*Primary Examiner* — Bob Phunkulh
(74) *Attorney, Agent, or Firm* — Lee, Hong, Degerman, Kang & Waimey

(57) ABSTRACT

A method and apparatus for transmitting a ranging signal, and a method and apparatus for receiving the ranging signal are disclosed. A ranging channel (RCH) for transmission of a ranging signal is allocated to the reuse-1 partition. However, the ranging channel (RCH) is allocated to the power-boosted reuse-3 partition only when there is no reuse-1 partition.

8 Claims, 13 Drawing Sheets

(56) References Cited

U.S. PATENT DOCUMENTS

| | | | |
|---|---|---|---|
| 2007/0002977 A1* | 1/2007 | Cho et al. | 375/340 |
| 2007/0115880 A1* | 5/2007 | Huh et al. | 370/329 |
| 2007/0121547 A1* | 5/2007 | Huh et al. | 370/329 |
| 2008/0072115 A1* | 3/2008 | Cho et al. | 714/751 |
| 2010/0214992 A1* | 8/2010 | Hart et al. | 370/329 |
| 2010/0317292 A1* | 12/2010 | Takatani et al. | 455/63.1 |
| 2010/0317364 A1* | 12/2010 | Zhang et al. | 455/452.2 |
| 2011/0003553 A1 | 1/2011 | Kim et al. | |
| 2011/0051667 A1* | 3/2011 | Park et al. | 370/328 |
| 2011/0194423 A1* | 8/2011 | Cho et al. | 370/252 |
| 2012/0113955 A1* | 5/2012 | Cho et al. | 370/330 |

FOREIGN PATENT DOCUMENTS

| | | |
|---|---|---|
| JP | 2009111505 | 5/2009 |
| KR | 10-2011-0023732 | 3/2011 |
| KR | 10-2011-0052420 | 5/2011 |
| KR | 10-1233184 | 2/2013 |
| WO | 2009/072184 | 6/2009 |
| WO | 2009/076067 | 6/2009 |
| WO | 2009/120031 | 10/2009 |
| WO | 2010090467 | 8/2010 |

OTHER PUBLICATIONS

LG Electronics, et al., "Proposed Text on the UL FFR Section(16.2.20.2)," IEEE 802.16 Broadband Wireless Access Working Group, IEEE C802.16m-10/0240r1, Mar. 2010, 4 pages.

IEEE WirelessMan 802.16, "Overview of IEEE P802.16m Technology and Candidate RIT for IMT-Advanced," IEEE 802.16 IMT-Advanced Evaluation Group Coordination Meeting, Jan. 2010, 87 pages (relevant sections: p. 15, 43, 44, 59).

Sassan Ahmadi, "An Overview of Next-Generation Mobile WiMAX Technology", IEEE Communications Magazine, Jun. 2009, 15 pages.

Korean Intellectual Property Office Application Serial No. 10-2011-0029916, Notice of Allowance dated Dec. 4, 2012, 2 pages.

The Intellectual Property Corporation of Malaysia Application Serial No. PI2011003642, Office Action dated Apr. 30, 2014, 3 pages.

* cited by examiner (a) Format 0

(b) Format 1

METHOD AND USER EQUIPMENT FOR TRANSMITTING RANGING SIGNAL, AND METHOD AND BASE STATION FOR RECEIVING RANGING SIGNAL

CROSS-REFERENCE TO RELATED APPLICATIONS

Pursuant to 35 U.S.C. §119, this application claims the benefit of earlier filing date and right of priority to Korean Patent Application No. 10-2011-0029916, filed on Mar. 31, 2011, and also claims the benefit of U.S. Provisional Application Ser. Nos. 61/374,270, filed on Aug. 17, 2010, and 61/373,281, filed on Aug. 13, 2010, the contents of all of which are incorporated by reference herein in their entirety.

BACKGROUND OF THE INVENTION

1. Field of the Invention

The present invention relates to a mobile communication system, and more particularly to a method and apparatus for transmitting a ranging signal, and a method and apparatus for receiving the ranging signal.

2. Discussion of the Related Art

The principal standards established by the Institute of Electrical and Electronics Engineers (IEEE) 802.16 task group are classified into IEEE 802.16-2004 also known as a Fixed WiMAX and an IEEE 802.16e-2005 (hereinafter referred to as '16e') also known as mobile WiMAX. The IEEE Std 802.16e-2005 was finalized by the IEEE on December 2005. Basic standards of a current-version mobile WiMAX technology include IEEE 802.16-2004, IEEE Std 802.16e-2005 (including Corrigenda of IEEE Std 802.16-2004), IEEE Std 802.16-2004/CorI-2005, IEEE Std 802.16f-2005, and IEEE Std 802.16™-2009 (Revision of IEEE Std 802.16-2004, developed by Maintenance Task Group under the draft title "P802.16Rev2") corrected and integrated on the basis of IEEE Std 802.16g-2007.

Ranging procedure for use in IEEE 802.16e is used for a variety of purposes. In more detail, the ranging procedure is classified into four ranging procedures, i.e., initial ranging, handover ranging, periodic ranging, and bandwidth request ranging. In case of the initial ranging, if a user equipment (UE) attempts to perform initial network entry, the initial ranging is used for acquisition of uplink time synchronization (i.e., time and frequency synchronization). In case of the handover ranging, if connection is changed from a source base station (BS) to a target base station (BS), the handover ranging is used to acquire initial synchronization from the target base station (BS). The periodic ranging enables a user equipment (UE) to periodically update uplink synchronization. The bandwidth request ranging enables a user equipment (UE) to request uplink resources from a base station (BS).

Nowadays, IEEE 802.16m (hereinafter referred to as '16m') standardization for the next-version mobile WiMAX is being intensively conducted in a TGm (802.16 Task Group m) of the IEEE 802.16 task group. The IEEE 802.16m system uses a variety of technologies (e.g., fractional frequency reuse (FFR) and the like) not selected in the previous-version mobile WiMAX. In conclusion, IEEE 802.16m needs to correct the ranging procedure and/or the ranging channel of the IEEE 802.16e according to the aforementioned newly selected technologies.

SUMMARY OF THE INVENTION

Accordingly, the present invention is directed to a method and a user equipment (UE) for transmitting a ranging signal and a method and a base station (BS) for receiving a ranging signal that substantially obviate one or more problems due to limitations and disadvantages of the related art.

An object of the present invention is to provide a method for efficiently constructing a ranging channel.

Another object of the present invention is to provide a method for establishing a ranging structure to minimize an inter-cell interference effect.

It is to be understood that technical objects to be achieved by the present invention are not limited to the aforementioned technical objects and other technical objects which are not mentioned will be apparent from the following description to the person with an ordinary skill in the art to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a ranging signal by a user equipment (UE) in a wireless communication system includes acquiring cell ID information using a preamble received from a base station (BS); receiving frequency partition configuration information from the base station (BS); allocating a ranging channel (RCH) for transmission of the ranging signal to a reuse-1 partition or to a power-boosted reuse-3 partition (when there is no reuse-1 partition, using the cell ID information and the frequency partition configuration information; and transmitting the ranging signal to the base station using the ranging channel (RCH).

In another aspect of the present invention, a method for receiving a ranging signal by a base station (BS) in a wireless communication system includes transmitting a preamble carrying cell ID information and transmitting uplink frequency partition configuration (UFPC) information to a user equipment (UE); and receiving the ranging signal on the basis of the cell ID information and the uplink frequency partition configuration (UFPC) information, using a reuse-1 partition or a power-boosted reuse-3 partition when the reuse-1 partition is not present.

In another aspect of the present invention, a user equipment (UE) for transmitting a ranging signal in a wireless communication system includes a receiver; a transmitter; and a processor configured to control the receiver and the transmitter, wherein the receiver is configured to receive a preamble and frequency partition configuration information from a base station (BS), and the processor acquires cell ID information using a preamble, allocates a ranging channel (RCH) for transmission of the ranging signal to a reuse-1 partition or to a power-boosted reuse-3 partition when the reuse-1 partition is not present, using the cell ID information and the frequency partition configuration information, and transmits the ranging signal to the base station using the ranging channel (RCH).

In another aspect of the present invention, a base station (BS) for receiving a ranging signal in a wireless communication system includes a transmitter; a receiver; and a processor which controls the transmitter to transmit a preamble carrying cell ID information and transmit uplink frequency partition configuration (UFPC) information to a user equipment (UE), and controls the receiver to receive the ranging signal on the basis of the cell ID information and the uplink frequency partition configuration information using a reuse-1 partition or a power-boosted reuse-3 partition when the reuse-1 partition is not present.

If the user equipment (UE) is not synchronized to the base station (BS), the ranging channel (RCH) is a non-synchronized ranging channel (NS-RCH), and frequency resources for the non-synchronized ranging channel (NS-RCH) is determined according to Equation 1:

$$I_{SB} = \mod(IDcell, R_{SB}) \quad \text{[Equation 1]}$$

where $I_{SB}$ is a subband index $(0, \ldots, R_{SB}-1)$ for the non-synchronized ranging channel (NS-RCH) from among $R_{SB}$ subbands, and $R_{SB}$ is determined by Equation 2:

$$R_{SB} = \frac{L_{SB\text{-}CRU,FP_i}}{4} \quad \text{[Equation 2]}$$

where $L_{SB\text{-}CRU,FP_i}$ is the number of subband contiguous resource units (CRUs) allocated to a frequency partition (FPi), and FPi is corresponding to the reuse-1 partition or corresponding to the power-boosted reuse-3 partition only when there is no reuse-1 partition.

If the user equipment (UE) is synchronized to the base station (BS), the ranging channel (RCH) is a synchronized ranging channel (S-RCH), and frequency resources for the synchronized ranging channel (S-RCH) is determined according to Equation 3:

$$I_{SB,s} = \mod(IDcell+1, R_{SB}) \quad \text{[Equation 3]}$$

where $I_{SB}$ is a subband index $(0, \ldots, R_{SB}-1)$ for the synchronized ranging channel (S-RCH) from among $R_{SB}$ subbands, and $R_{SB}$ is determined by Equation 4:

$$R_{SB} = \frac{L_{SB\text{-}CRU,FP_i}}{4} \quad \text{[Equation 4]}$$

where $L_{SB\text{-}CRU,FP_i}$ is the number of subband contiguous resource units (CRUs) allocated to a frequency partition FPi, and FPi is corresponding to the reuse-1 partition or corresponding to the power-boosted reuse-3 partition only when there is no reuse-1 partition.

It is to be understood that both the foregoing general description and the following detailed description of the present invention are exemplary and explanatory and are intended to provide further explanation of the invention as claimed.

The aforementioned technical solutions are only a part of the embodiments of the present invention, and various modifications to which technical features of the present invention are applied could be understood by the person with ordinary skill in the art to which the present invention pertains, based on the following detailed description of the present invention.

As apparent from the above description, exemplary embodiments of the present invention have the following effects. The embodiments of the present invention can reduce a danger of causing high interference in a signal of a neighboring cell.

The embodiments of the present invention can prevent a control channel from being excessively allocated to a specific frequency partition.

The embodiments of the present invention can efficiently transmit uplink control information.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to an IEEE 802.16 system, the following description can be applied to other mobile communication systems except unique features of the IEEE 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Meanwhile, in the present invention, if a certain signal is allocated to superframe/frame/subframe/symbol/carrier/subcarrier, it means that the certain signal is transmitted through the corresponding carrier/subcarrier during a period/timing of the corresponding superframe/frame/subframe/symbol.

Figure 1:
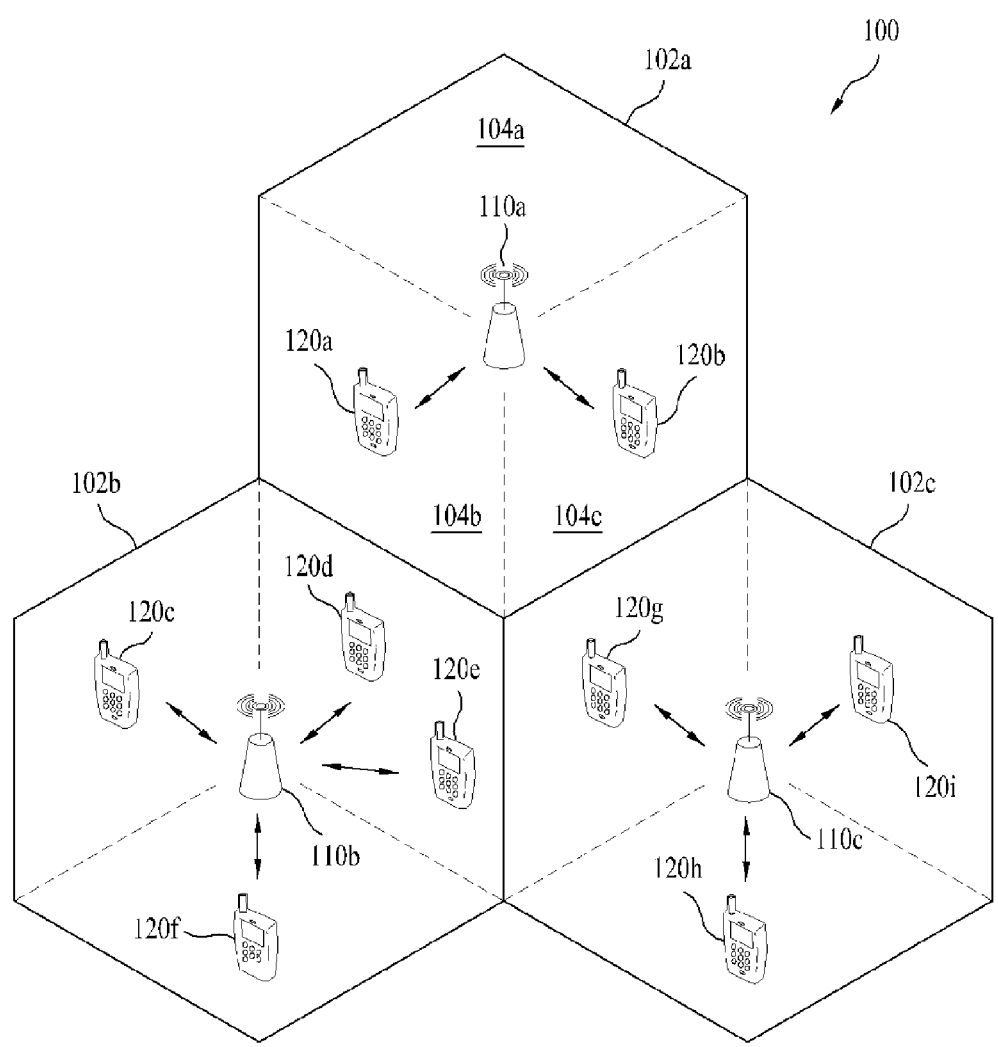
FIG. 1 is a diagram illustrating the configuration of an exemplary wireless communication system.

FIG. 1 is a diagram illustrating the configuration of an exemplary wireless communication system.

Referring to FIG. 1, a wireless communication system 100 includes a plurality of Base Stations (BSs) 110a, 110b and 110c and a plurality of User Equipments (UEs) 120a to 120i. A base station (BS) usually means a fixed station that performs communication with a user equipment and/or another base station, and exchanges various kinds of data and control information with the user equipment and another base station. The base station may be referred to another terminology such as an evolved-NodeB (eNB), a base transceiver system (BTS), an access point (AP), and advanced base station (ABS). Each BS 110a, 110b or 110c provides services to its specific geographical area 102a, 102b or 102c. The specific geographical area 102a, 102b or 102c is usually referred to as a cell. For the purpose of improving system performance, the cell may further be divided into a plurality of smaller areas 104a, 104b and 104c. These smaller areas may be called sectors or segments. In the present invention, a cell, a sector, or a segment refers to a geographical area to which a BS or an antenna group provides a communication service in the present invention. Therefore, communication with a specific cell, a specific sector or a specific segment may be equivalent to communication with an antenna group that provides a communication service in the specific cell, the specific sector or the specific segment. A downlink/uplink signal in the specific cell, sector or segment is a downlink/uplink signal from or to the antenna group that provides a communication service in the specific cell, sector or segment. In addition, the channel state/quality of the specific cell, sector or segment is the channel state/quality of a channel or communication link established between the antenna group and a specific UE in a geographical area corresponding to the specific cell, sector or segment. For reference, a cell identifier for use in the IEEE (Institute of Electrical and Electronics Engineers) 802.16m system is allocated on the basis of the entire system. On the other hand, a sector or segment identifier is allocated on the basis of a specific region in which a service is provided from each base station (BS), and is allocated any value of 0 to 2. All subcarriers may be grouped on the basis of the sector or segment identifier.

A user equipment (UE) 120a to 120i denotes a mobile or fixed type user terminal. Examples of the user equipment include various equipments that transmit and receive user data and/or various kinds of control information to and from a base station. The terminal equipment may be referred to as a terminal equipment (TE), a mobile station (MS), an advanced mobile station (AMS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

Each UE may communicate with at least one BS on a downlink and an uplink at a point of time. The communication may be conducted in Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination of them. Herein, a downlink refers to a communication link directed from a BS to a UE and an uplink refers to a communication link directed from the UE to the BS.

Figure 2:
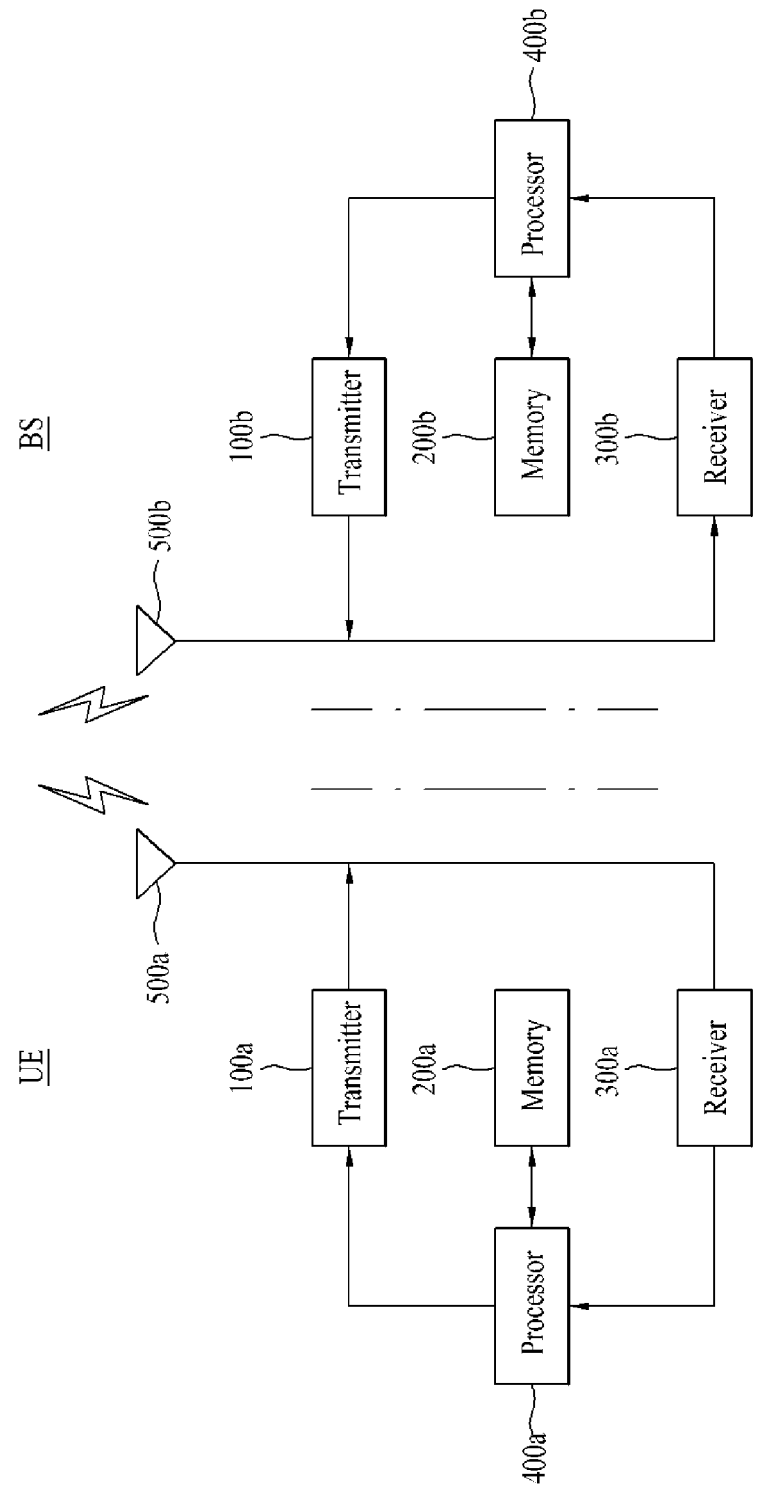
FIG. 2 is a block diagram of a user equipment (UE) and a base station (BS) for implementing an embodiment of the present invention.

FIG. 2 is a block diagram of a UE and a BS for implementing the present invention.

The UE serves as a transmitting device on the uplink and as a receiving device on the downlink. In contrast, the BS may serve as a receiving device on the uplink and as a transmitting device on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured by a combination of more than one physical antenna element. In either case, the signal transmitted from each antenna port is not designed to be further deconstructed by the UE receiver 300a. The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. That is, according to the antenna port of the embodiments of the present invention, a channel for transmitting a symbol on the antenna port may be derived from the channel through which a different symbol on the same antenna port is transmitted. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 3:
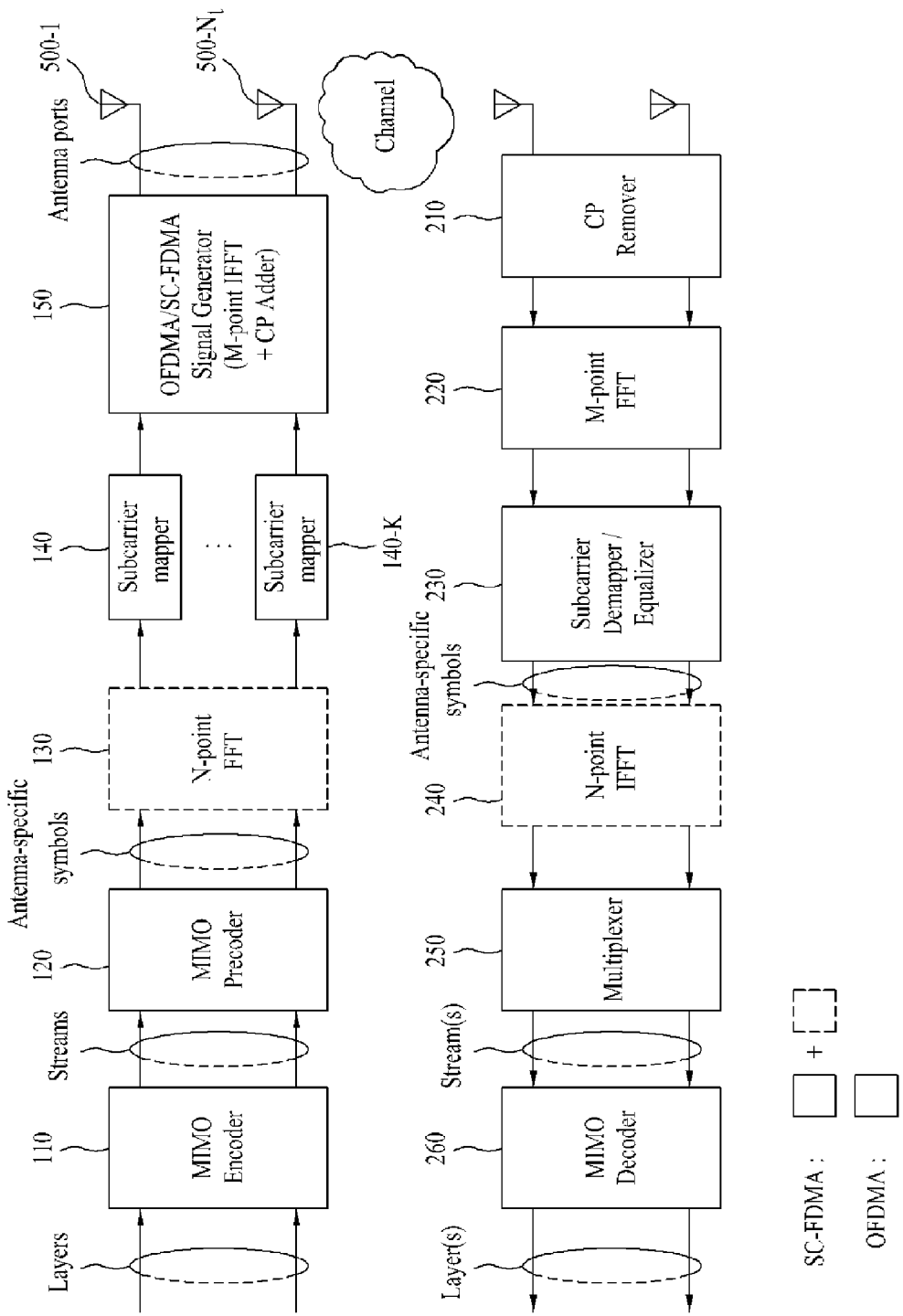
FIG. 3 is a block diagram of an exemplary transmitter in each of a user equipment (UE) and a base station (BS)

FIG. 3 is a block diagram of an exemplary transmitter in each of the UE and the BS. Operations of the transmitters 100a and 100b will be described below in more detail with reference to FIG. 3.

Referring to FIG. 3, each of the Orthogonal Frequency Division Multiple Access (OFDMA) transmitters 100a and 100b includes a MIMO encoder 110, a MIMO precoder 120, subcarrier mappers 140-1 to 140-K, and an OFDMA signal generator(s) 150. Each of the transmitters 100a and 100b is connected to $N_t$ transmission antennas 500-1 to 500-$N_t$.

The MIMO encoder 110 encodes a transmission data stream in accordance with a predetermined coding scheme to form coded data and modulates the coded data to be arranged as symbols representing positions on a signal constellation in a predetermined modulation scheme. The transmission data stream input to the MIMO encoder 110 may be generated by subjecting a data block received from a MAC layer to various signal processes such as channel encoding, interleaving, and scrambling. The data stream may be referred to as a codeword or a layer and is equivalent to a data block from the MAC layer. The data block from the MAC layer is referred to as a transport block. The modulation scheme may be, but not limited to, any of m-Phase Shift Keying (m-PSK) and m-Quadrature Amplitude Modulation (m-QAM). For modulating the coded data, the MIMO encoder 110 may have an independent modulation module. In the mean time, the MIMO encoder 110 may define MIMO streams of the input symbols such that the MIMO precoder 120 can distribute antenna-specific symbols to corresponding antenna paths. A MIMO stream refers to an information path input to the MIMO precoder 120, and the information path before the MIMO precoder 120 may be referred to as a virtual antenna or a MIMO stream. To define the MIMO streams of the symbols, the MIMO encoder 110 may be provided with a MIMO stream mapper configured as an independent module.

The MIMO precoder 120 outputs antenna-specific symbols to the subcarrier mappers 140-1 to 140-K by processing the received symbols in accordance with a MIMO scheme according to the multiple transmission antennas 500-1 to 500-$N_t$. Mapping of the MIMO streams to the antennas 500-1 to 500-$N_t$ is performed by the MIMO precoder 120. Specifically, the MIMO precoder 120 multiplies the output x of the MIMO encoder 110 by an $N_t \times M_t$ precoding matrix W. The output of the MIMO precoder 120 may be represented as an $N_t \times N_F$ matrix z.

The subcarrier mappers 140-1 to 140-K allocate the antenna-specific symbols to appropriate subcarriers and multiplex them according to UEs. In the mean time, the subcarrier mappers 140-1 to 140-K may include a Logical Resource Unit (LRU) allocation block (not shown) for dividing the modulated symbols into LRU sized segments and allocating each segment to the LRU. The subcarrier mappers 140-1 to 140-K can include a mapping block (not shown) for mapping the LRU into burst data. The data burst is allocated to a Physical Resource Unit (PRU) in a physical frequency domain. Accordingly, the subcarrier mappers 140-1 to 140-K serve to map the modulated data into subcarriers in accordance with a mapping relation between the LRU and the PRU.

The OFDMA signal generator(s) 150 output OFDM symbols by modulating the antenna-specific symbols according to an OFDM modulation scheme. For example, the OFDMA signal generators 150 may perform Inverse Fast Fourier Transform (IFFT) for the antenna-specific symbols and insert a Cyclic Prefix (CP) into the resulting IFFT time-domain symbol. After digital-to-analog conversion and frequency upconversion, the OFDMA symbol is transmitted to the receiver through the transmission antennas 500-1 to 500-$N_t$. The OFDMA signal generator 150 may include an IFFT module, a CP inserter, a Digital-to-Analog Converter (DAC), and a frequency upconverter.

The OFDMA receivers 300a and 300b process signals in reverse to the operation of the OFDMA transmitters.

More specifically, the receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module. More specifically, the signal recoverer may include an Analog-to-Digital Converter (ADC) for converting an analog signal to a digital signal, a CP remover 210 for removing a CP from the digital signal, a Fast Fourier Transform (FFT) module 220 for generating frequency symbols by applying FFT to the CP-removed signal, and a subcarrier demapper/equalizer 230 for recovering the frequency symbols to antenna-specific symbols. A multiplexer 250 recovers MIMO streams from the antenna-specific symbols and a MIMO decoder 260 recovers the data streams transmitted by the transmitting apparatus from the MIMO streams.

Compared to the OFDMA transmitter, a Single Carrier Frequency Division Multiple Access (SC-FDMA) transmitter further includes an FFT module 130 before the subcarrier mappers 140 to 140-K. The SC-FDMA transmitter may significantly reduce Peak-to-Average Power Ratio (PAPR) by spreading a plurality of data in the frequency domain through FFT before IFFT is performed, relative to the OFDMA scheme. An SC-FDMA receiver further includes an IFFT module 240 after the subcarrier demapper/equalizer 230 in addition to the components of the OFDMA receiver. The SC-FDMA receiver processes a signal in reverse to the operation of the SC-FDMA transmitter.

Although it has been described in FIG. 2 and FIG. 3 that each of the transmitters 110a and 100b includes the MIMO encoder 110, the MIMO precoder 120, the subcarrier mappers 140-1 to 140-K, and the OFDMA/SC-FDMA signal generators 150, the processors 400a and 400b of the transmitter may include the MIMO encoder 110, the MIMO precoder 120, the subcarrier mappers 140-1 to 140-K, and the OFDMA/SC-FDMA signal generators 150. Likewise, although it has been described in FIG. 2 and FIG. 3 that each of the receivers 300a and 300b includes the signal recoverer, the multiplexer, and the channel demodulator, the processors 400a and 400b of the receiver may include the signal recoverer, the multiplexer, and the channel demodulator. Hereinafter, for convenience of description, the MIMO encoder 110, the MIMO precoder 120, the subcarrier mappers 140-1 to 140-K, and the OFDMA/SC-FDMA signal generators 150 are included in the transmitters 100a and 100b separated from the processors 400a and 400b that control the operations of the MIMO encoder 110, the MIMO precoder 120, the subcarrier mappers 140-1 to 140-K, and the OFDMA/SC-FDMA signal generators 150. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the MIMO encoder 110, the MIMO precoder 120, the subcarrier mappers 140-1 to 140-K, and the OFDMA/SC-FDMA signal generators 150 are included in the processors 400a and 400b and the case where the signal recoverer, the multiplexer, and the channel demodulator are included in the processors 400a and 400b.

Figure 4:
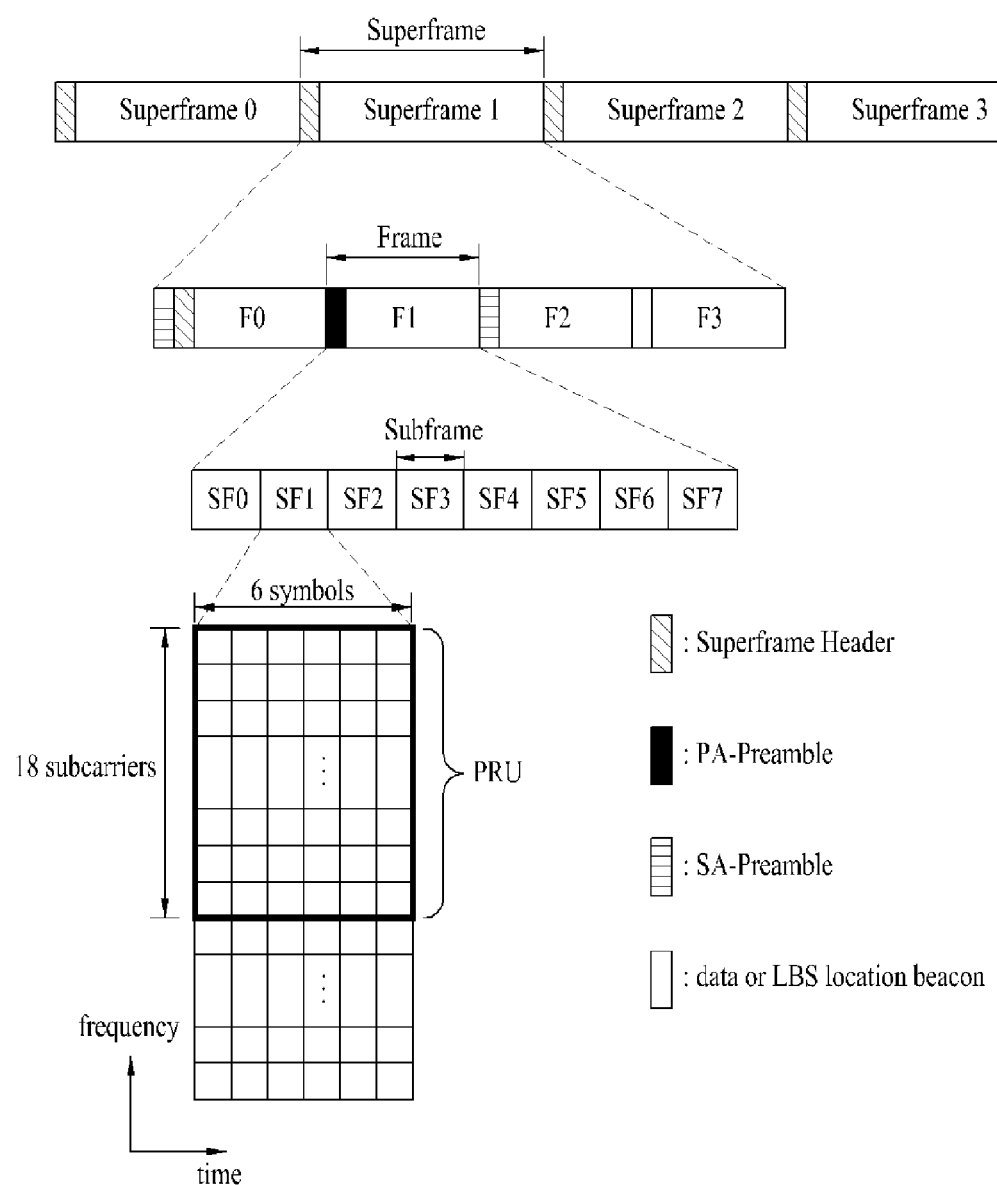
FIG. 4 illustrates an exemplary structure of a radio frame of IEEE 802.16m used in the wireless communication system according to an embodiment of the present invention.

FIG. 4 illustrates an exemplary structure of a radio frame of IEEE 802.16m used in the wireless communication system. The radio frame structure can be applied to a Frequency Division Duplex (FDD) mode, a Half Frequency Division Duplex (H-FDD) mode, and a Time Division Duplex (TDD) mode.

Referring to FIG. 4, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size.

One frame can include a certain number of subframes. For a 5/10/20 MHz system bandwidth, one frame may include eight subframes SF0 to SF7. For an 8.75 MHz system bandwidth, one subframe may include seven subframes SF0 to SF6. For a 7 MHz system bandwidth, one subframe may include six subframes SF0 to SF5. The subframe is allocated for downlink or uplink transmission. The frame can be configured differently depending on duplex modes. For example, since downlink transmission and uplink transmission are identified by frequency in the FDD mode, one frame includes either downlink subframes or uplink subframes. In the FDD mode, for the system bandwidth of 5/10/20 MHz, the eight subframes of each frame are numbered from 0 to 7. An idle time can exist at the end of each frame. On the other hand, since downlink transmission and uplink transmission are identified by time in the TDD mode, subframes within the frame are classified into downlink subframes and uplink subframes. For a system bandwidth of 5/10/20 MHz, for example, n downlink subframes out of eight subframes are indexed from 0 to n−1 and the remaining (8-n) uplink subframes are indexed from 0 to (8-n)−1 in each frame.

A subframe is a unit of a Transmission Time Interval (TTI). In other words, one TTI is defined by one or more subframes. In general, a basic TTI is set to one subframe. The TTI means a time interval during which a physical layer transmits coded packets through a radio interface. Accordingly, one subframe or a plurality of neighboring subframes can be used for transmission of data packets.

A subframe includes a plurality of OFDMA symbols in the time domain and a plurality of subcarriers in the frequency domain. The OFDMA symbols may be referred to as OFDMA symbols or SC-FDMA symbols depending on a multiplexing access scheme. The number of OFDMA symbols in a subframe may vary depending on a channel bandwidth and a CP length. The type of a subframe can be identified depending on the number of OFDMA symbols included in the subframe. For example, subframe type-1 includes six OFDMA symbols, subframe type-2 includes seven OFDMA symbols, subframe type-3 includes five OFDMA symbols, and subframe type-4 includes nine OFDMA symbols. A frame may include one type of subframes or different types of subframes. For the convenience' sake of description, the embodiments of the present invention will be described in the context of subframe type-1 including six OFDM symbols. However, it is to be noted that the embodiments of the present invention, which will be described later, are also applicable to the other types of subframes in the same manner.

In the frequency domain, an OFDMA symbol includes a plurality of subcarriers and the number of subcarriers is determined according to the size of FFT. The subcarriers may be classified into data subcarriers for data transmission, pilot subcarriers for channel estimation, and null subcarriers for a guard band and a DC component. Parameters for the OFDMA symbols include, for example, BW, $N_{used}$, n, G, etc. The BW is a nominal channel bandwidth. $N_{used}$ is the number of subcarriers used for signal transmission. Also, n is a sampling factor that determines a subcarrier spacing and a useful symbol time together with BW and $N_{used}$. G is the ratio of CP time to a useful symbol time.

A basic resource allocation unit in a logical frequency domain is referred to as a Logical Resource Unit (LRU) and a basic resource allocation unit in a physical frequency domain is referred to as a Physical Resource Unit (PRU). PRUs are mapped to LRUs by frequency permutation. Permutation means a process of mapping predetermined physical resources to logical resources.

A subframe includes a plurality of PRUs in the frequency domain. Each PRU includes a plurality of consecutive OFDMA symbols in the time domain and a plurality of consecutive subcarriers in the frequency domain. For example, the number of OFDMA symbols $N_{sym}$ in the PRU may be equal to the number of OFDMA symbols included in the subframe. In the mean time, the number of subcarriers within the PRU may be 18. In this case, the PRU of the type-1 subframe includes 6 OFDM symbols×18 subcarriers. The PRU may be a Distributed Resource Unit (DRU) or a Contiguous Resource Unit (CRU) depending on a resource allocation type. A basic permutation unit of an uplink DRU is a tile composed of 6 subcarriers and $N_{sym}$ symbols. A basic permutation unit of a downlink DRU is a tone-pair that includes two subcarriers and one symbol. In case of subframe type-1, one PRU includes 108 tones. A tone may also be referred to as a Resource Element (RE). Contiguous Logical Resource Units (CLRUs) are obtained through direct mapping of CRUs. Two types of CLRUs, subband LRUs and miniband LRUs are supported according to two types of CRUs, subband-based CRUs and miniband-based CRUs, respectively.

A frequency band may be divided into subbands and/or minibands, each including a predetermined number of resource units (RUs). A subband includes $N_1$ (e.g. 4) consecutive PRUs and a miniband includes $N_2$ (e.g. 1) consecutive PRUs.

Each superframe contains a SuperFrame Header (SFH). The SFH carries essential system parameters and system configuration information. The SFH can be located in the first subframe within a superframe and use the last 5 OFDM symbols which form a type-3 subframe within the first subframe. SFH includes a control channel for broadcasting important system information to be recognized by a UE. The SFH carries essential system parameters and system configuration information. The SFH can be classified into a Primary SFH (P-SFH) and a Secondary SFH (S-SFH). The P-SFH is transmitted per superframe. The S-SFH may be transmitted per superframe. The S-SFH may be divided into three subpackets (S-SFH SP1, SUESFH SP2, and S-SFH SP3), so that the three subpackets are transmitted. The subpackets (hereinafter referred to as S-SFH SPs) of the S-SFH may be periodically transmitted. Individual subpackets may have different transmission periods.

One superframe carries up to four downlink synchronization signals. A downlink synchronization signal is used for downlink synchronization. In an IEEE 802.16m system, for example, a downlink synchronization signal includes a primary synchronization signal with a Primary Advanced preamble (PA-preamble) and a secondary synchronization signal with a Secondary Advanced preamble (SA-preamble). Each of the PA-preamble, the SA-preamble, and a DL LBS location beacon is located in the first symbol of a frame in the FDD mode and the TDD mode. The PA-preamble delivers information about a system bandwidth and a carrier configuration. Thus a UE may acquire the system bandwidth and carrier configuration information from the PA-preamble. The SA-preamble carries a cell Identifier (ID) of a BS. The SA-preamble is located at the first symbols of the first and third frames in a superframe, thus can be accumulated twice. A UE may detect the cell ID of the BS or perform cell scanning during handover, using the SA-preamble twice transmitted in one superframe. In more detail, the PA-preamble is located at the first symbol of the second frame F1 within the superframe, and the SA-preamble is located at the first symbol of the other three frames F0 and F2. The first symbol of the last frame F3 within the superframe contains the DL LBS location beacon if the superframe is for location measurement for DL LBS, or the first symbol of the last frame F3 within the superframe contains a data signal.

On the other hand, a ranging signal for uplink synchronization may be transmitted through an uplink (UL) ranging channel (RCH). The UL ranging channel (RCH) is used for UL synchronization. The UL RCH can be further classified into non-synchronized ranging channel (NS-RCH) and synchronized ranging channel (S-RCH) for non-synchronized and synchronized UEs, respectively. The S-RCH is used for periodic ranging. The NS-RCH is used for initial access and handover. The periodic ranging may indicate an operation and procedure for enabling a UE to periodically update UL synchronization. The initial access ranging may indicate an operation and procedure for uplink time/frequency synchronization acquisition when a UE initially accesses a wireless communication system. The handover ranging may indicate, when a UE is handed over from a current BS to a different BS, an operation and procedure for establishing initial synchronization with the aforementioned different BS.

Ranging is the process of acquiring the correct timing offset, frequency offset and power adjustments so that the UE's transmissions are aligned with the BS, and they are received within the appropriate reception thresholds. After DL synchronization, the UE attempts to perform initial ranging with the BS. If the ranging procedure is successfully completed, the UE is UL synchronized to the BS.

The aforementioned structure is only exemplary. Accordingly, various modifications can be made to the length of a superframe, the number of subframes included in the superframe, the number of OFDMA symbols included in a subframe, and parameters of OFDMA symbols. For example, the number of subframes included in a frame may vary depending on the channel bandwidth and the CP length.

Figure 5:
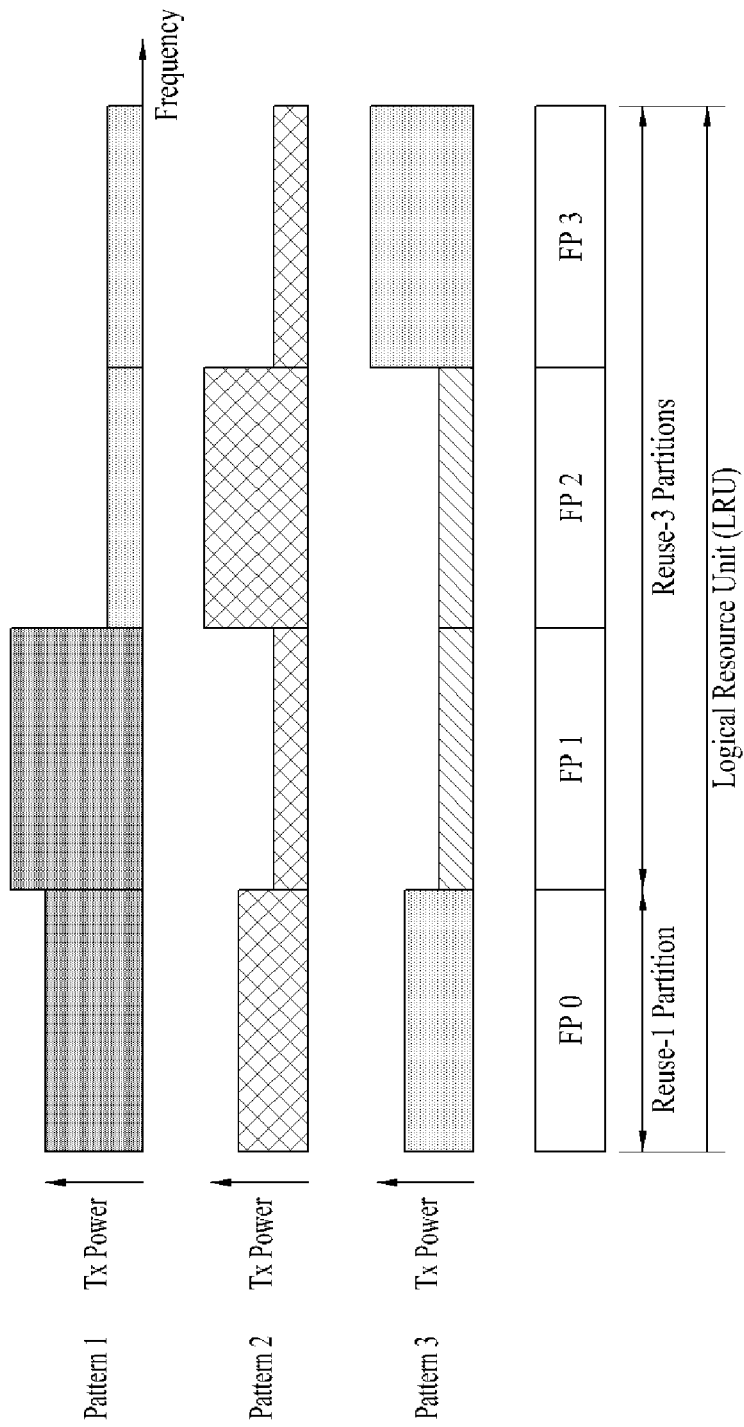
FIG. 5 exemplarily illustrates frequency partitions for fractional frequency reuse (FFR)

FIG. 5 exemplarily illustrates frequency partitions for fractional frequency reuse (FFR). Specifically, FIG. 5 is a conceptual diagram illustrating the fractional frequency reuse (FFR) according to the reuse-3 scenario.

In a frequency domain, PRUs may be allocated to at least one frequency partition (FP). A frequency partition may be used for the purpose such as the FFR. Fractional Frequency Reuse (FFR) techniques allow different frequency reuse factors to be applied over different frequency partitions. According to the IEEE 802.16m system, a system bandwidth may be divided into a maximum of 4 FPs (FP0, FP1, FP2, and FP3). Referring to FIG. 5, in case of the reuse-3 scenario, a system bandwidth may be divided into four FPs (FP0, FP1, FP2, and FP3) in a logical frequency domain. In the four FPs (FP0, FP1, FP2, and FP3), FP0 may be referred to as a reuse-1 partition, and the remaining three FPs (FP1, FP2, and FP3) may be referred to as reuse-3 partitions. In this case, a specific partition may not be allocated actual frequency resources, and may not be constructed and used as necessary. FPs may have different power levels as shown in FIG. 5. From among the reuse-3 partitions, one reuse-3 partition having a higher power level than other reuse-3 partitions may be referred to as a power-boosted reuse-3 partition. Referring to FIG. 5, in FFR patterns (FFR pattern 1, FFR pattern 2, and FFR pattern 3), power-boosted reuse-3 partitions may be FP1, FP2, and FP3, respectively. The different FFR patterns may be used among consecutive or neighboring cells in different ways, so that interference from other cells may be minimized in the power-boosted reuse-3 partition within each cell.

Each frequency partition (FP) may include one or more PRUs. Distributed resource allocation and/or contiguous resource allocation may be applied to each FP. A logical resource unit (LRU) may be a basic logical unit for distributed resource allocation and contiguous resource allocation. A Logical Distributed Resource Unit (LDRU) may include a plurality of subcarriers (Sc) distributed within the frequency band. The LDRU may have the same size as that of the PRU. The LDRU may also be referred to as a Distributed LRU (DLRU). A Logical Contiguous Resource Unit (LCRU) may include contiguous subcarriers (Sc). The LCRU has the same size as that of the PRU. The LCRU is also referred to as a CLRU.

UL FFR including the number of FPs and the size of each FP may be broadcast through the SFH. For example, UL FP configuration information may be transmitted in the form of an Uplink Frequency Partition Configuration (UFPC) field according to an FFT size through the S-SFH SP2. Table 1 exemplarily shows UFPC and frequency partitioning for 2048 FFT. Table 2 exemplarily shows UFPC and frequency partitioning for 1024 FFT. Table 3 exemplarily shows UFPC and frequency partitioning for 512 FFT.

In Tables 1 to 3, FP0 is a reuse-1 partition, and FP1, FP2, or FP3 is a reuse-3 partition. A frequency partition count (FPCT) may define the number of FPs, and FPSi (Frequency Partition Size i) may define the number of PRUs allocated to the i-th FP. $N_{PRU}$ is a total number of PRUs supported by a corresponding system bandwidth. $N_{PRU}$ may be changed according to an FFT size and a system bandwidth. FPi, FPCT and FPSi may be determined according to UFPC as shown in Tables 1 to 3.

In Tables 1 to 3, in FP0:FP1:FP2:FP3, '0' may indicate that the corresponding FP is not used. For example, as can be seen from Table 1, assuming that DFPC is set to 1, 'FP0:FP1:FP2:FP3=0:1:1:1' is achieved, which means that FP0 serving as the reuse-1 partition is not used.

Figure 6:
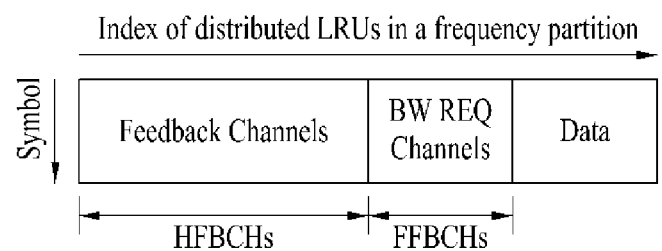
FIG. 6 exemplarily illustrates a downlink subframe structure for use in an IEEE 802.16m system.

FIG. 6 exemplarily illustrates a downlink subframe structure for use in the IEEE 802.16m system. Specifically, FIG. 6

TABLE 1

UFPC and frequency partitioning for 2048 FFT

| UFPC | Frequency Partitioning (FP0:FP1:FP2:FP3) | FPCT | FPS0 | FPSi(i > 0) |
|---|---|---|---|---|
| 0 | 1:0:0:0 | 1 | $N_{PRU}$ | 0 |
| 1 | 0:1:1:1 | 3 | 0 | FPS1 = $N_{PRU}$ − 2 * floor($N_{PRU}$/3) <br> FPS2 = floor($N_{PRU}$/3) <br> FPS3 = floor($N_{PRU}$/3) |
| 2 | 1:1:1:1 | 4 | $N_{PRU}$ − 3 * floor($N_{PRU}$/4) | floor($N_{PRU}$/4) |
| 3 | 3:1:1:1 | 4 | $N_{PRU}$ − 3 * floor($N_{PRU}$/6) | floor($N_{PRU}$/6) |
| 4 | 5:1:1:1 | 4 | $N_{PRU}$ − 3 * floor($N_{PRU}$/8) | floor($N_{PRU}$/8) |
| 5 | 9:1:1:1 | 4 | $N_{PRU}$ − 3 * floor($N_{PRU}$/12) | floor($N_{PRU}$/12) |
| 6 | 9:5:5:5 | 4 | $N_{PRU}$ − 3 * floor($N_{PRU}$ * 5/24) | floor($N_{PRU}$ * 5/24) |
| 7 | 0:1:1:0 | 2 | 0 | $N_{PRU}$/2 for i = 1, 2 <br> 0 for i = 3 |
| 8 | 1:1:1:0 | 3 | $N_{PRU}$ − 2 * floor($N_{PRU}$/3) | floor($N_{PRU}$/3) for i = 1, 2 <br> 0 for i = 3 |
| 9~15 | Reserved | | | |

TABLE 2

UFPC and frequency partitioning for 1024 FFT

| UFPC | Frequency Partitioning (FP0:FP1:FP2:FP3) | FPCT | FPS0 | FPSi(i > 0) |
|---|---|---|---|---|
| 0 | 1:0:0:0 | 1 | $N_{PRU}$ | 0 |
| 1 | 0:1:1:1 | 3 | 0 | FPS1 = $N_{PRU}$ − 2 * floor($N_{PRU}$/3) <br> FPS2 = floor($N_{PRU}$/3) <br> FPS3 = floor($N_{PRU}$/3) |
| 2 | 1:1:1:1 | 4 | $N_{PRU}$ − 3 * floor($N_{PRU}$/4) | floor($N_{PRU}$/4) |
| 3 | 3:1:1:1 | 4 | $N_{PRU}$ − 3 * floor($N_{PRU}$/6) | floor($N_{PRU}$/6) |
| 4 | 5:1:1:1 | 4 | $N_{PRU}$ − 3 * floor($N_{PRU}$/8) | floor($N_{PRU}$/8) |
| 5 | 9:5:5:5 | 4 | $N_{PRU}$ − 3 * floor($N_{PRU}$ * 5/24) | floor($N_{PRU}$ * 5/24) |
| 6 | 0:1:1:0 | 2 | 0 | $N_{PRU}$/2 for i = 1, 2 <br> 0 for i = 3 |
| 7 | 1:1:1:0 | 3 | $N_{PRU}$ − 2 * floor($N_{PRU}$/3) | floor($N_{PRU}$/3) for i = 1, 2 <br> 0 for i = 3 |

TABLE 3

UFPC and frequency partitioning for 512 FFT

| UFPC | Frequency Partitioning (FP0:FP1:FP2:FP3) | FPCT | FPS0 | FPSi(i > 0) |
|---|---|---|---|---|
| 0 | 1:0:0:0 | 1 | $N_{PRU}$ | 0 |
| 1 | 0:1:1:1 | 3 | 0 | $N_{PRU}$/3 |
| 2 | 1:1:1:1 | 4 | $N_{PRU}$/4 | $N_{PRU}$/4 |
| 3 | 3:1:1:1 | 4 | $N_{PRU}$/2 | $N_{PRU}$/6 |
| 4 | 9:5:5:5 | 4 | $N_{PRU}$ * 3/8 | $N_{PRU}$ * 5/24 |
| 5 | 0:1:1:0 | 2 | 0 | $N_{PRU}$/2 for i = 1, 2 <br> 0 for i = 3 |
| 6 | 1:1:1:0 | 3 | $N_{PRU}$/3 | $N_{PRU}$/3 for i = 1, 2 <br> 0 for i = 3 |
| 7 | Reserved | | | | exemplarily shows that data channels and UL control channels are allocated in a UL subframe.

Referring to FIG. 6, DLRUs in UL frequency partition may be divided into data, bandwidth request, and feedback regions. A feedback region consists of feedback channels that can be used for both HARQ ACK (ACKnowledgment)/NACK (Negative ACK) and fast feedback. The bandwidth request region may be composed of bandwidth request channels available to a bandwidth request. A data region may be used for data transmission. UL control channels other than a ranging channel (RCH) may start with a first DLRU, and may be allocated to DLRUs within a frequency partition (FP) in the order of UL HARQ feedback channels (UL HFBCHs)→UL fast feedback channels (UL FFBCHs)→UL bandwidth request (UL BW REQ) channels→and UL data channels.

DLRU is used after frequency partitioning. Therefore, a first DLRU is present in each FP. In addition, assuming that FFR is used in a UL subframe, UL control channels may be allocated to a reuse-1 partition or power-boosted reuse-3 partition. Therefore, information regarding a frequency partition (FP) including UL control channels is needed. A base station (BS) may inform a UE of an FP in which UL control channels will be located, through the SFH. For example, information regarding the FP in which UL control channels are located may be indicated by S-SFH SP1 as shown in the following Table 4.

TABLE 4

| | |
|---|---|
| 0b0 | Reuse-1 partition |
| 0b1 | Power-boosted reuse-3 partition |

Referring to Table 4, the base station (BS) may broadcast S-SFH SP1 in which a "frequency partition location for UL control channels" field is set to 0b0 or 0b1. A UE having received the S-SFH SP1 allocates a UL control channel to the reuse-1 partition when the above-mentioned field contained in the S-SFH SP1 is set to 0b0, and transmits the UL control channel to the BS. If the above-mentioned field contained in the S-SFH SP1 is set to 0b1, the UE allocates the UL control channel to the power-boosted reuse-3 partition and transmits it to the BS.

Figure 7:
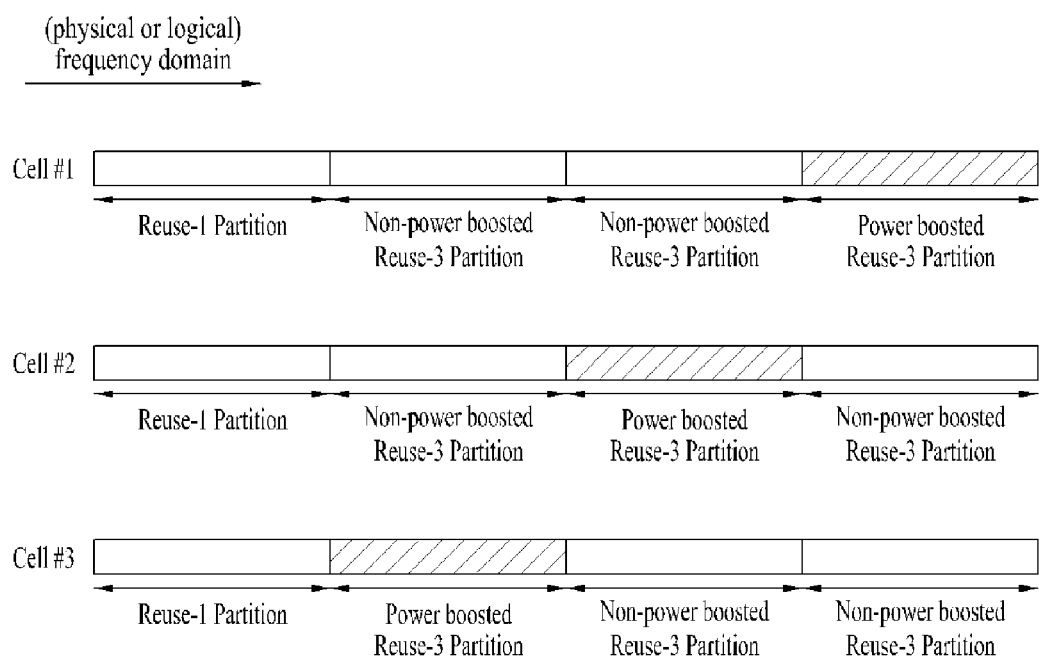
FIG. 7 illustrates an example in which neighboring cells use a plurality of frequency partitions.

FIG. 7 illustrates an example in which neighboring cells use a plurality of frequency partitions.

Multiple frequency partitions are designed for a specific purpose. Generally, the power-boosted reuse-3 partition is designed to transmit an uplink signal at a higher transmission (Tx) power than a non-power boosted reuse-3 partition. In the same manner as in UEs located at a cell edge, a BS is designed for enabling a UE that undergoes a high propagation loss or poor channel state to transmit an uplink signal at a higher transmission (Tx) power using the power-boosted reuse-3 partition. In order to minimize interference of consecutive cells caused by the power-boosted reuse-3 partition, neighboring cells may use different frequency partitions as the power-boosted reuse-3 partition as shown in FIG. 7.

Figure 8:
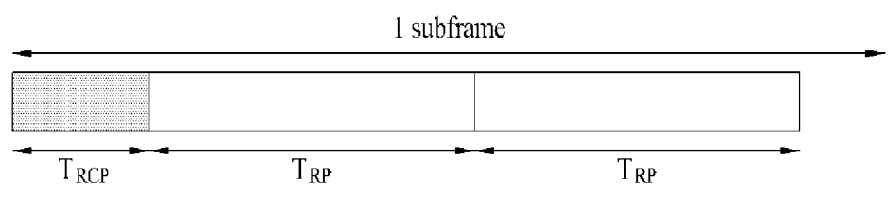
FIGS. 8(a)-8(b) and 9 illustrate a ranging channel structure available to the embodiments of the present invention in a time domain.
Figure 8:
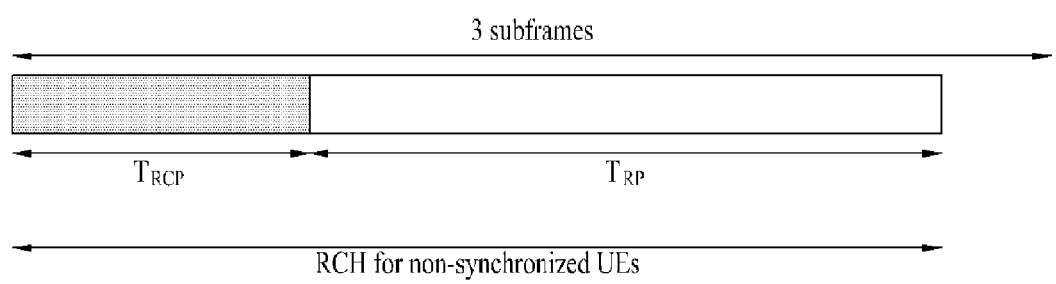
Figure 9:
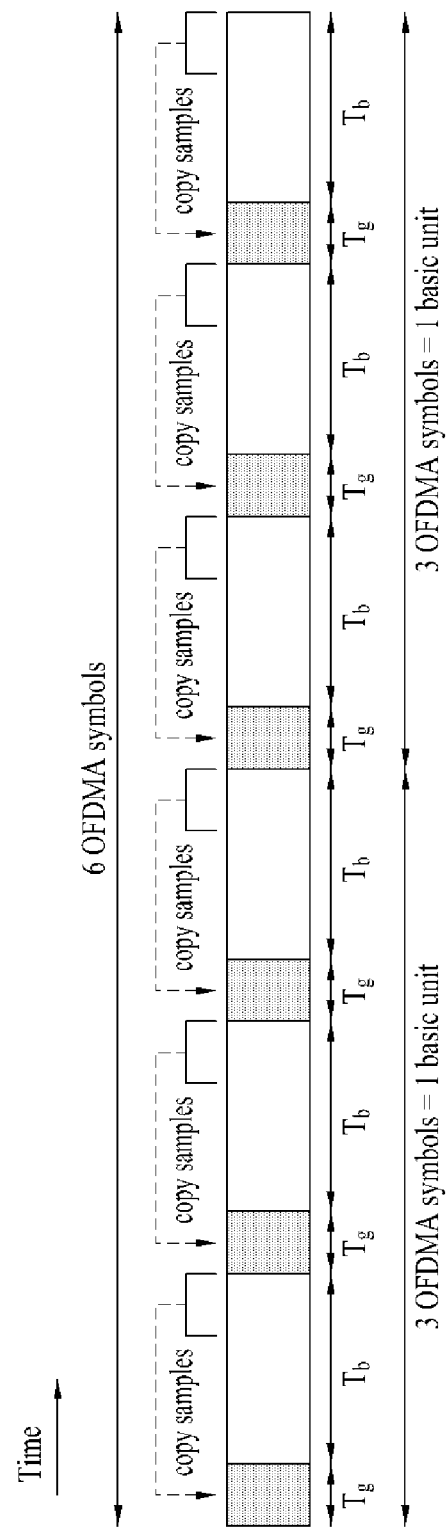

FIGS. 8(a)-8(b) and 9 illustrate a ranging channel structure available to the embodiments of the present invention in a time domain. Specifically, FIGS. 8(a)-8(b) exemplarily show a ranging channel (RCH) for non-synchronized UEs, and FIG. 9 exemplarily shows a ranging channel (RCH) for synchronized UEs.

Referring to FIGS. 8(a)-8(b), The NS-RCH is used for initial network entry and association and for ranging against a target BS during handover. A physical NS-RCH consists of the ranging preamble (RP) with length of $T_{RP}$ depending on the ranging subcarrier spacing $\Delta f_{RP}$, and the ranging cyclic prefix (RCP) with length of $T_{RCP}$ in the time domain. RCP is the copy of the rear part of RP, without phase discontinuity between RCP and RP. A NS-RCH occupies a localized bandwidth corresponding to 1 subband. The NS-RCH may be composed of Format 0 or Format 1. Referring to FIG. 8(a), NS-RCH of Format 0 is constructed in one UL subframe. Referring to FIG. 8(b), NS-RCH of Format 1 is constructed in three UL subframes. The transmission start time of the NS-RCH is aligned with the corresponding UL AAI subframe start time at the DL synchronized UE.

Referring to FIG. 9, the S-RCH is used for periodic ranging. A UE that is already synchronized to a T-ABS is allowed to transmit the periodic ranging signal. The physical structure of S-RCH occupies 72 subcarriers by 6 OFDMA symbols starting from the first OFDMA symbol within a subframe, where there are two repeated signal waveforms and each signal waveform as a basic unit is generated by the ranging preamble code over 72 subcarriers by 3 OFDMA symbols. In FIG. 9, $T_b$ is defined as a useful symbol time, and $T_g$ is defined as a CP time. $T_b$ is defined as $1/\Delta f$, and $T_g$ is defined as $G \cdot T_b$. In this case, G is the ratio of CP time ($T_g$) to useful symbol time ($T_b$). For example, G may be set to any one of 1/4, 1/8, 1/16, etc.

UE may recognize a time position of NS-RCH or S-RCH by broadcast signaling from the BS. NS-RCH or S-RCH may be allocated per one or more frame/superframe periods, and may be allocated to a subframe position shifted by a specific subframe offset at every allocation period.

On the other hand, a frequency position of NS-RCH or S-RCH may be cell-specifically determined without additional signaling. A subband allocated to NS-RCH and a subband allocated to S-RCH may be determined by a cell ID (IDcell) and the number ($Y_{SB}$) of allocated subbands as shown in Equations 1 and 2.

$$I_{SB}=\text{mod}(IDcell, Y_{SB}) \quad \text{[Equation 1]}$$

In Equation 1, $I_{SB}$ is a subband index (0, ..., $Y_{SB}-1$) allocated to NS-RCH from among $Y_{SB}$ subbands.

$$I_{SB,s}=\text{mod}(IDcell+1, Y_{SB}) \quad \text{[Equation 2]}$$

In Equation 2, $I_{SB,s}$ is a subband index (0, ..., $Y_{SB}-1$) allocated to S-RCH from among $Y_{SB}$ subbands.

A total number ($Y_{SB}$) of subbands ranging over all the frequency partitions may be calculated by the following equation 3.

$$Y_{SB} = \sum_{i=0}^{3} \frac{L_{SB\text{-}CRU,FP_i}}{N_1} \quad \text{[Equation 3]}$$

In Equation 3, $L_{SB\text{-}CRU,FPi}$ is the number of subband CRUs allocated to a frequency partition (FPi). $N_1$ is the number of PRUs constructing one subband. For example, $N_1$ may be set to 4.

As can be seen from FIG. 6, a frequency position to which UL control channels other than the RCH may be allocated may be limited to the reuse-1 partition or the power-boosted reuse-3 partition. In contrast, according to Equations 1 and 2, frequency positions of NS-RCH and S-RCH may be allocated all over partitions.

RCH is a contention based channel, so that it is generally difficult to correctly control Tx power of the RCH. In addition, when attempting to perform RCH transmission, ramping of Tx power of the RCH is performed so that the RCH may be transmitted at high power. If RCH having the above-mentioned characteristics is allocated to the power-boosted reuse-3 partition, the RCH may generate high interference in the power-boosted reuse-3 partition of a neighboring cell. Therefore, the RCH frequency position must be determined in consideration of a frequency partition (FP) in the same manner as in other UL control channels.

In order to overcome the problems encountered when RCH is allocated by Equation 1 or 2, a method for allocating the RCH to a frequency partition (FP) to which other UL control channels are allocated may be considered. However, in the case where the RCH is allocated to the same FP as those of other UL control channels, overload occurs in the above-mentioned FP. If several FPs are used by FFR, UL control channels such as high-speed feedback channel or BW REQ channel may be allocated only to a specific FP indicated by SFH. Therefore, capacity of each FP is limited so that there is a limitation in allocating a large number of UL control channels to a specific FP. In other words, the number of UEs, each of which can allocate UL control channels to a specific FP, may be limited. When RCH is allocated to the FP to which UL control channels are allocated, the above-mentioned limitation becomes serious. Since one RCH occupies one subband, two subbands are needed for NS-RCH and S-RCH transmission. Therefore, if other UL control channels and the RCH are allocated to a specific FP indicated by SFH, frequency resources that can be used by the other UL control channels in the specific FP may be reduced as much as resources used for RCH. Although there are a large amount of resources of the specific FP in such a manner that RCH and other UL control channels can simultaneously use the resources, the amount of the remaining resources after allocation of the RCH and UL control channels is reduced, resources for data communication can also be reduced. In this case, although a cell-edge UE having a poor channel state effectively transmits control information to the BS through the reuse-1 partition or the power-boosted reuse-3 partition, the corresponding FP has an insufficient amount of resources for data communication, so that substantial communication throughput may be reduced.

Therefore, in order to overcome the above-mentioned problems simultaneously while effectively transmitting the RCH, the following embodiments for selecting frequency resources used in RCH transmission are proposed as follows.

First Embodiment

Use of Duplicated Frequency Partitions (FPs)

The first embodiment allocates the RCH to the reuse-1 partition and the power-boosted reuse-3 partition, instead of allocating the RCH only to a frequency partition (FP) to which other UL control channels are allocated.

Figure 10:
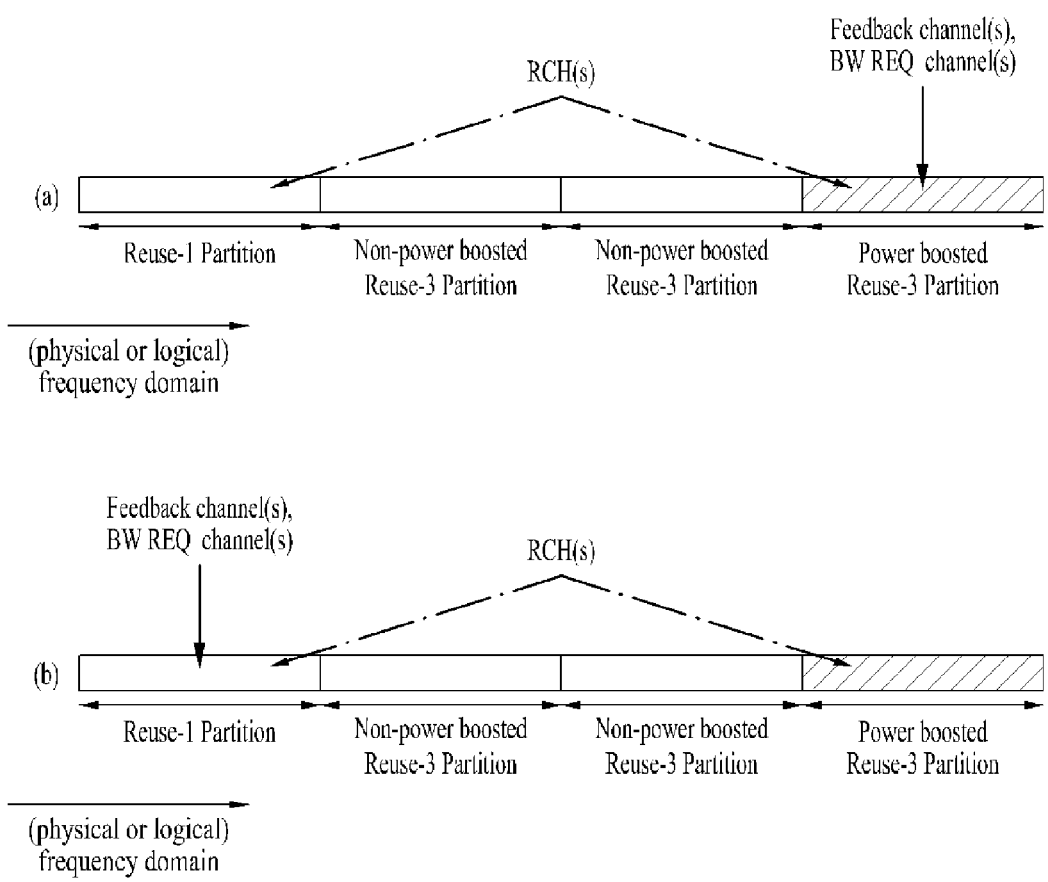
FIGS. 10(a)-10(b) exemplarily illustrate ranging channel (RCH) allocation according to a first embodiment of the present invention.

FIGS. 10(a)-10(b) exemplarily illustrate ranging channel (RCH) allocation according to a first embodiment of the present invention. Specifically, FIG. 10(a) shows an example in which a frequency partition (FP) position for UL control channels but not RCH indicates the power-boosted reuse-3 partition. FIG. 10(b) shows an example in which a frequency partition (FP) position for other UL control channels but not RCH indicates the reuse-1 partition. The aforementioned FP for other UL control channels can be indicated by BS through SFH, as previously stated above.

Irrespective of whether the FP for other UL control channels is the reuse-1 partition or the power-boosted reuse-3 partition, a UE located at a predetermined cell allocates the corresponding RCH to the reuse-1 partition or the power-boosted reuse-3 partition for the predetermined cell. Referring to Equations 1 and 2, frequency resources for the RCH are determined using a total number ($Y_{SB}$) of subbands allocated all over FPs. That is, according to Equations 1 and 2, frequency resources of the RCH may be cell-specifically selected from among $Y_{SB}$ subbands. However, the first embodiment of the present invention selects RCH frequency resources from among the reuse-1 partition and the power-boosted reuse-3 partition.

For example, according to the following equations, RCH frequency resources may be cell-specifically determined without additional signaling. A subband allocated to NS-RCH and a subband allocated to S-RCH may be determined by a cell ID (IDcell) and the number ($R_{SB}$) of subbands allocated to the reuse-1 partition and the power-boosted reuse-3 partition, as shown in Equations 4 and 5.

$$I_{SB}=\mathrm{mod}(\mathrm{IDcell}, R_{SB}) \quad [\text{Equation 4}]$$

In Equation 4, $I_{SB}$ is a subband index (0, . . . , $R_{SB}-1$) allocated to NS-RCH from among $R_{SB}$ subbands.

$$I_{SB,s}=\mathrm{mod}(\mathrm{IDcell}+1, R_{SB}) \quad [\text{Equation 5}]$$

In Equation 5, $I_{SB,s}$ is a subband index (0, . . . , $R_{SB}-1$) allocated to S-RCH from among $R_{SB}$ subbands.

The number ($R_{SB}$) of subbands allocated to the reuse-1 partition and the power-boosted reuse-3 partition may be calculated by the following equation 6.

$$R_{SB} = \sum_{\substack{i=0 \\ i \neq \text{non-power boosted reuse-3 partition}}}^{\text{total number of partitions}-1} \frac{L_{SB-CRU,FP_i}}{4} \quad [\text{Equation 6}]$$

In Equation 6, $L_{SB-CRU,FP_i}$ is the number of subband CRUs allocated to a frequency partition (FPi).

The UE according to the first embodiment of the present invention may allocate NS-RCH to any one of the reuse-1 partition and the power-boosted reuse-3 partition according to Equation 4. The UE allocates other UL control channels such as a feedback channel or BW REQ channel to a frequency partition (FP) indicated by the S-SFH SP1 from among the reuse-1 partition or the power-boosted reuse-3 partition. Therefore, according to the first embodiment of the present invention, the other UL control channels and the RCH may be allocated to the same FP or different FPs. However, no control channels are allocated to a non-power boosted FP.

Second Embodiment

Use of FPs Different from Other UL Control Channels

The second embodiment of the present invention allocates the RCH to FPs other than an FP to which other UL control channels are allocated. For example, provided that other UL control channels such as a feedback channel and a BW REQ channel are allocated to any one of the reuse-1 partition and the power-boosted reuse-3 partition that are indicated by the S-SFH SP1, RCH may be allocated to a different partition to which the other UL channels are not allocated, from among the reuse-1 partition and the power-boosted reuse-3 partition.

For example, provided that other UL control channels such as a feedback channel and a BW REQ channel is allocated to any one of the reuse-1 partition and the power-boosted reuse-3 partition that are indicated by the S-SFH SP1, RCH is allocated to a different partition to which the aforementioned other UL channels are not allocated, from among the reuse-1 partition and the power-boosted reuse-3 partition.

Figure 11:
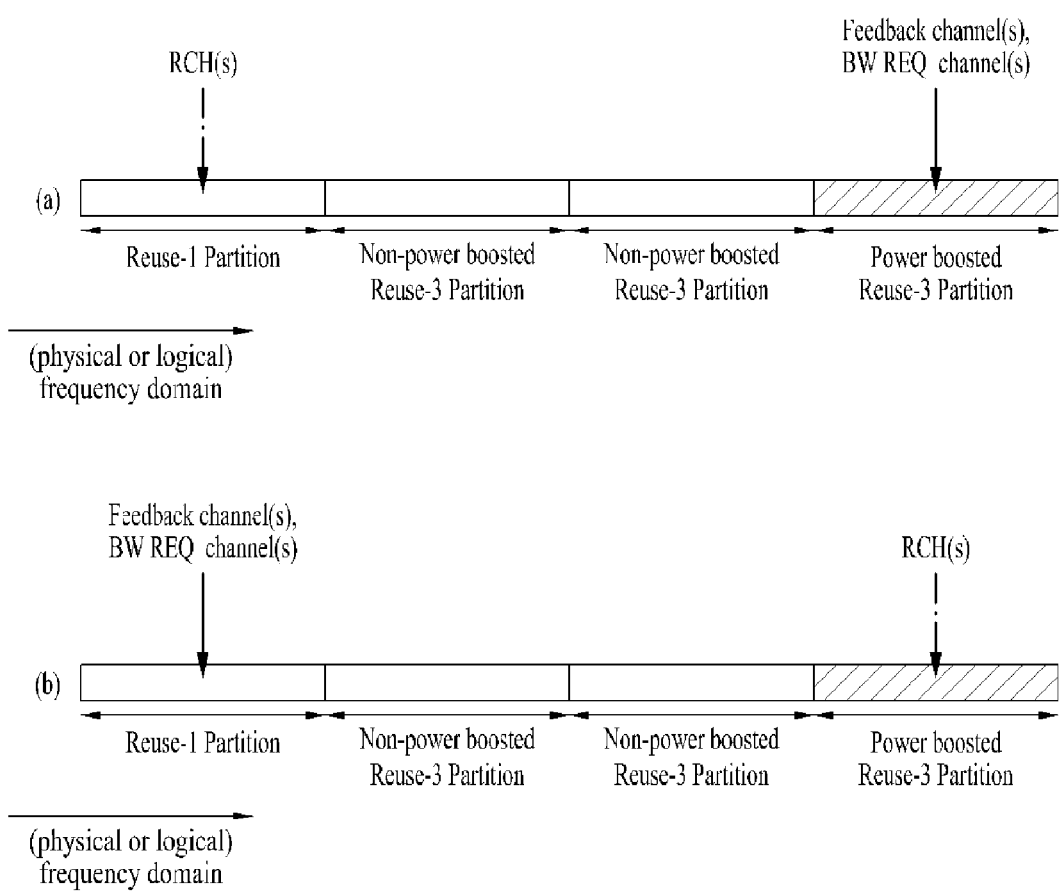
FIGS. 11(a)-11(b) exemplarily illustrate ranging channel (RCH) allocation according to a second embodiment of the present invention.

FIGS. 11(a)-11(b) exemplarily illustrate RCH allocation according to a second embodiment of the present invention. FIG. 11(a) shows an example in which a frequency partition (FP) position for UL control channels but not RCH indicates the power-boosted reuse-3 partition. FIG. 11(b) shows an example in which a frequency partition (FP) position for other UL control channels but not RCH indicates the reuse-1 partition. The aforementioned FP for other UL control channels can be indicated by BS through SFH, as previously stated above.

Referring to FIG. 11(a), provided that an FP for other UL control channels is the power-boosted reuse-3 partition, a UE located in a predetermined cell allocates the corresponding RCH to the reuse-1 partition. Referring to FIG. 11(b), provided that the FP for other UL control channels is the reuse-1 partition, the UE allocates the corresponding RCH to the power-boosted reuse-3 partition of the predetermined cell. In other words, a UE having received the S-SFH SP1 in which "frequency partition (FP) position field for UL control channels" field is set to 0b0 allocates other UL control channels to the reuse-1 partition, allocates the RCH to the power-boosted reuse-3 partition, and transmits the allocated result. On the other hand, a UE having received the S-SFH SP1 in which "frequency partition (FP) position field for UL control channels" field is set to 0b1 allocates other UL control channels to the power-boosted reuse-3 partition, and allocates the RCH to the reuse-1 partition, and transmits the allocated result.

However, according to UL frequency partition configurations shown in Tables 1 to 3, any one of the reuse-1 partition and the power-boosted reuse-3 partition may not be configured. In this case, the UE may allocate the RCH to the same frequency partition (FP) as a frequency partition (FP) indicated for UL control channels.

For example, according to the following equations, RCH frequency resources may be cell-specifically determined without additional signaling. A subband allocated to NS-RCH and a subband allocated to S-RCH may be determined by a cell ID (IDcell) and the number ($R_{SB}$) of subbands allocated to the reuse-1 partition or the power-boosted reuse-3 partition, as shown in Equations 7 and 8.

$$I_{SB} = \mathrm{mod}(\mathrm{IDcell}, R_{SB}) \quad \text{[Equation 7]}$$

In Equation 7, $I_{SB}$ is a subband index (0, ..., $R_{SB}-1$) allocated to NS-RCH from among $R_{SB}$ subbands.

$$I_{SB,s} = \mathrm{mod}(\mathrm{IDcell}+1, R_{SB}) \quad \text{[Equation 8]}$$

In Equation 8, $I_{SB,s}$ is a subband index (0, ..., $R_{SB}-1$) allocated to S-RCH from among $R_{SB}$ subbands.

The number ($R_{SB}$) of subbands allocated to the reuse-1 partition or the power-boosted reuse-3 partition may be calculated by the following equation 9.

$$R_{SB} = \frac{L_{SB\text{-}CRU,FP_i}}{4} \quad \text{[Equation 9]}$$

In Equation 9, $L_{SB\text{-}CRU,FP_i}$ is the number of subband CRUs allocated to a frequency partition ($FP_i$). In Equation 9, $FP_i$ may indicate one partition, not indicated for other UL control channels by the BS, from among the reuse-1 partition and the power-boosted reuse-3 partition. For example, the frequency partition (FP) for other control channels may be signaled from the BS to the UE through the frequency partition field for UL control channels in the S-SFH SP1.

A UE according to a second embodiment of the present invention may allocate the NS-RCH to any one of subbands of one partition, non-indicated for UL control channels, from among the reuse-1 partition and the power-boosted reuse-3 partition according to Equation 7. The UE according to the second embodiment of the present invention may allocate the S-RCH to any one of subbands of one partition, non-indicated for UL control channels, from among the reuse-1 partition and the power-boosted reuse-3 partition according to Equation 8. The UE may allocate other UL control channels such as a feedback channel and a BW REQ channel to a partition indicated for UL control channels. Therefore, according to the second embodiment of the present invention, the aforementioned other UL control channels and the RCH are not allocated to the same frequency partition (FP) except that the reuse-1 partition and/or the reuse-2 partition are/is not present.

Third Embodiment

Use of Frequency Partition (FP) According to Pre-Defined Priority

The third embodiment of the present invention allocates the RCH to a partition having a large amount of frequency resources, irrespective of a frequency partition (FP) to which other UL control channels are allocated. The third embodiment of the present invention may prevent a shortage of resources when control channels are concentrated and allocated to a specific FP. As can be seen from Tables 1, 2 and 3, in most cases, FP0 from among FP0, FP1, FP2 and FP3 uses the largest amount of resources, and FP0 may generally be the reuse-1 partition. Therefore, according to the third embodiment of the present invention, RCH may be primarily allocated to FP0 having the largest amount of resources.

As can be seen from Tables 1, 2 and 3, there may occur a specific case in which an FP0 or a reuse-1 partition is not present. In association with the aforementioned case, it may be predetermined which one of frequency partitions (FPs) is allocated the RCH. For example, provided that FP0 is not present, it may be predetermined that RCH is allocated to the power-boosted reuse-3 partition. In another example, provided that there is no FP0 or reuse-1 partition, it may be predetermined that RCH is allocated to a partition having the smallest index (or the highest index).

Figure 12:
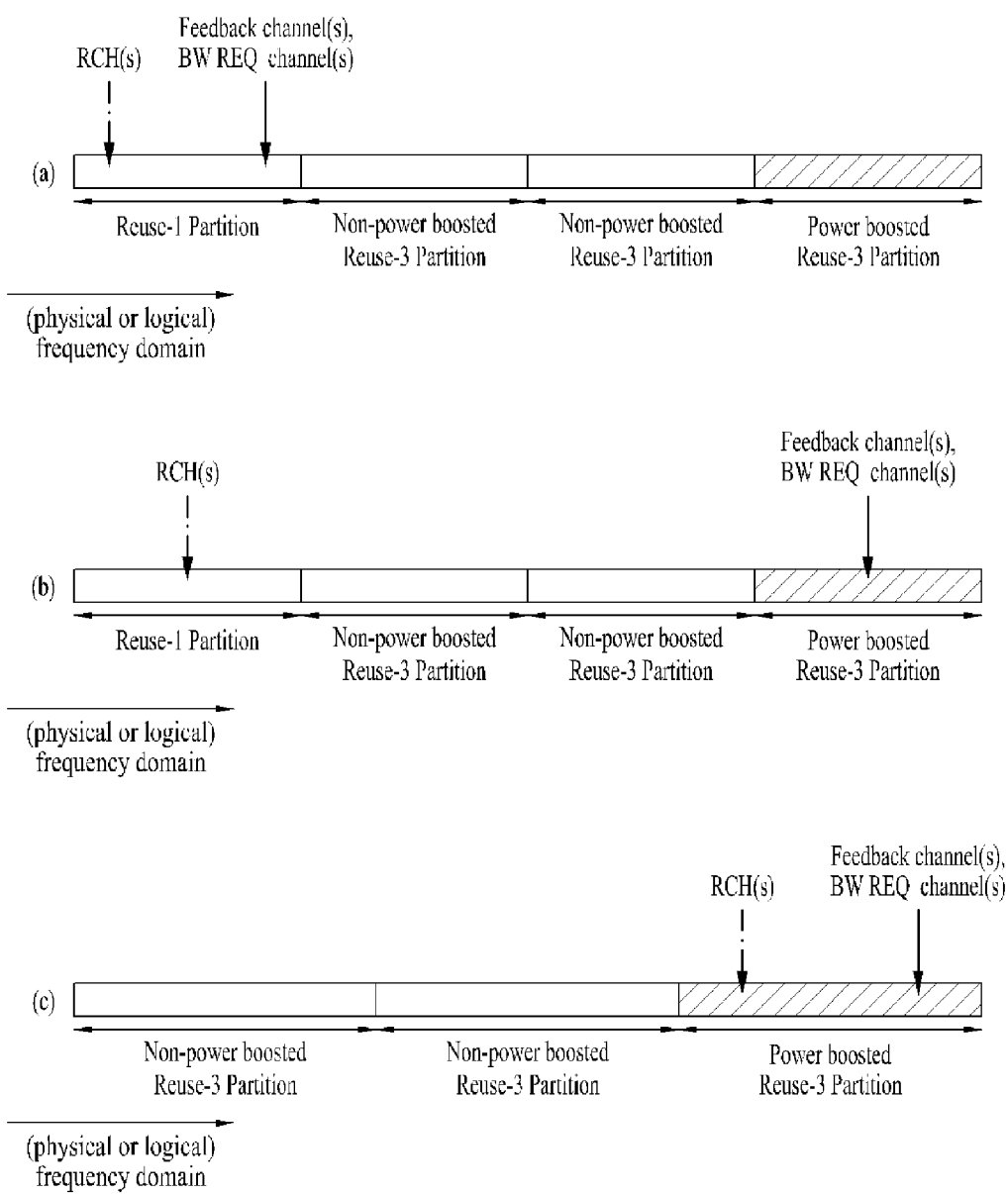
FIGS. 12(a)-12(c) exemplarily illustrate ranging channel (RCH) allocation according to a third embodiment of the present invention.

FIGS. 12(a)-12(c) exemplarily illustrate ranging channel (RCH) allocation according to a third embodiment of the present invention. Specifically, FIG. 12(a) exemplarily shows RCH allocation under the condition that the reuse-1 partition is configured and the reuse-1 partition is a frequency partition (FP) for UL control channels, FIG. 12(b) exemplarily shows RCH allocation under the condition that the reuse-1 partition is configured and the power-boosted reuse-3 partition is a frequency partition (FP) for UL control channels, and FIG. 12(c) exemplarily shows RCH allocation under the condition that the reuse-1 partition is not configured.

Referring to FIG. 12(a), a UE may allocate the RCH to the reuse-1 partition, and may allocate general UL control channels (for example, a feedback channel and a BW REQ channel) to a specific reuse-1 partition indicated by the BS from among the reuse-1 partition and the power-boosted reuse-3 partition. In this case, not only other control channels of the UE but also the RCH may be allocated to the reuse-1 partition, and then transmitted to the BS.

Referring to FIG. 12(b), the UE may allocate the RCH to the reuse-1 partition, and may allocate other UL control channels to the power-boosted reuse-3 partition indicated for UL control channels by the BS. In this case, the RCH of the UE may be allocated to a frequency partition different from those of other control channels, and then transmitted to the BS.

Referring to FIG. 12(c), if there is no reuse-1 partition, the UE may allocate the RCH, for example, to the power-boosted reuse-3 partition according to a predetermined rule.

The UE may determine whether the reuse-1 partition (or FP0) is configured on the basis of uplink frequency partition configuration (UFPC) information sent from the BS.

For example, according to the following equations, RCH frequency resources may be cell-specifically determined without additional signaling. A subband allocated to NS-RCH and a subband allocated to S-RCH may be determined by a cell ID (IDcell) and the number ($R_{SB}$) of subbands allocated to the reuse-1 partition or the power-boosted reuse-3 partition, as shown in Equations 10 and 11.

$$I_{SB}=\mathrm{mod}(\mathrm{IDcell}, R_{SB}) \quad \text{[Equation 10]}$$

In Equation 10, $I_{SB}$ is a subband index (0, ..., $R_{SB}-1$) allocated to NS-RCH from among $R_{SB}$ subbands.

$$I_{SB,s}=\mathrm{mod}(\mathrm{IDcell}+1, R_{SB}) \quad \text{[Equation 11]}$$

In Equation 11, $I_{SB,s}$ is a subband index (0, ..., $R_{SB}-1$) allocated to S-RCH from among $R_{SB}$ subbands.

The number ($R_{SB}$) of subbands allocated to the reuse-1 partition or the power-boosted reuse-3 partition may be calculated by the following equation 12.

$$R_{SB} = \frac{L_{SB\text{-}CRU,FP_i}}{4} \quad \text{[Equation 12]}$$

In Equation 12, $L_{SB\text{-}CRU,FPi}$ is the number of subband CRUs allocated to a frequency partition (FPi). In this case, FPi may indicate the reuse-1 partition. However, when there is no reuse-1 partition, FPi may correspond to a power-boosted reuse-3 partition.

A UE according to a third embodiment of the present invention may allocate the NS-RCH to any one of subbands of the reuse-1 partition according to Equation 10. However, if there is no reuse-1 partition, the NS-RCH is allocated to any one of subbands of the power-boosted reuse-3 partition. The UE according to the third embodiment of the present invention may allocate the S-RCH to any one of subbands of the reuse-1 partition according to Equation 11. However, only if there is no reuse-1 partition, the S-SRCH is allocated to any one of subbands of the power-boosted reuse-3 partition. Each UE may allocate other UL control channels such as a feedback channel and a BW REQ channel to a partition indicated for UL control channels.

For reference, as can be seen from Equations 1 to 12, $L_{SB\text{-}CRU,FPi}$ may indicate the number of subband CRUs allocated to FPi. A total number of CRUs allocated to FPi (where i≥0) in units of a subband may be given by UCAS, indicating Uplink CRU allocation size.

In FP0, the number of subband-based CRUs may be determined by $UCAS_{SB,0}$. UE may recognize $UCAS_{SB,0}$ related to FP0 through the SFH. For example, BS may perform signaling of $UCAS_{SB,0}$ related to FP0 on the SFH. The number ($L_{SB\text{-}CRU,FP0}$) of subband-based CRUs in FP0 may be calculated by the following equation 13.

$$L_{SB\text{-}CRU,FP_0}=N_1 \cdot UCAS_{SB,0} \quad \text{[Equation 13]}$$

In association with FPi (i>0,FPCT≠2), in order to perform signaling of the same number of allocated CRUs, $UCAS_i$ having only one value may be signaled for all i values (where i>0). If UFPC is set to zero (UFPC=0), $UCAS_i$ (i>0) may be zero. UE may receive $UCAS_i$ for FPi (i>0,FPCT≠2) through the SFH. In this case, the number ($L_{SB\text{-}CRU,FPi}$) of subband CRUs present in FPi (i>0) may be calculated by the following equation 14.

$$L_{SB\text{-}CRU,FP_i}=N_1 \cdot \min\{UCAS_i, K_{SB,FP_i}\} \quad \text{[Equation 14]}$$

If FPCT is set to 2 (FPCT=2), $UCAS_{SB,i}$ for i values (i=1 and i=2) may be signaled in the SFH using $UCAS_{SB,0}$. If FPCT is set to 2 (FPCT=2), each of FP0 and FP3 becomes empty, $L_{SB\text{-}CRU,FP0}$ is set to zero ($L_{SB\text{-}CRU,FP0}=0$), and $L_{SB\text{-}CRU,FP3}$ is set to zero. In association with i=1 and i=2, $L_{SB\text{-}CRU,FPi}=N_1 \cdot UCAS_{SB,0}$ is achieved.

Figure 13:
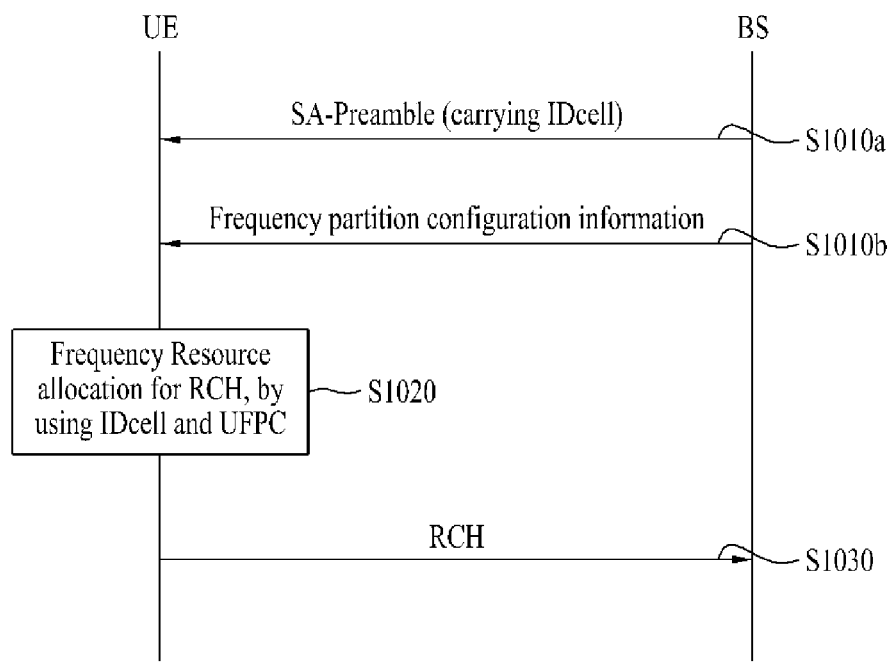
FIG. 13 is a flowchart illustrating ranging signal transmission according to embodiments of the present invention.

FIG. 13 is a flowchart illustrating ranging signal transmission according to embodiments of the present invention.

Referring to FIG. 13, BS may transmit a preamble (for example, SA-preamble) carrying a cell ID (IDcell) indicating cell ID information at step S1010a. In addition, the BS determines a UL frequency partition for a specific cell, and may transmit the UL frequency partition configuration (UFPC) information to UE(s) located in the specific cell at step S1010b. The BS may broadcast the UFPC information through the SFH.

The UE may receive the preamble at step S1010a, and may acquire a cell ID from the received preamble. For example, UE may derive a cell ID from the SA-preamble using the following method. Each cell has a cell ID (IDcell) represented by an integer from 0 to 767. The cell ID (IDcell) may be defined by a segment index. Generally, IDcell may be determined by the following equation 15.

$$\mathrm{IDcell}=256n+Idx \quad \text{[Equation 15]}$$

In Equation 15, n is the index of the SA-Preamble carrier-set 0, 1 and 2 representing segment ID. The segment ID may be determined according to the following description.

The number of subcarriers allocated to an SA-Preamble can be varied depending on the size of FFT (Fast Fourier Transform). For example, the length of SA-Preamble may have 144, 288 and 576 for 512-FFT, 1024-FFT, and 2048-FFT, respectively. In the case where an M-point IFFT module of an FDMA/SC-FDMA transmitter performs 512-IFFT, up to 144 subcarriers may be allocated to an SA-Preamble. In the case of 1024-IFFT, up to 288 subcarriers may be allocated to an SA-Preamble. In the case of 2048-IFFT, up to 576 subcarriers may be allocated to an SA-Preamble. If the subcarriers of which indexes are 256, 512, and 1024 are respectively reserved to DC component for 512-FFT, 1024-FFT and 2048-FFT, the subcarriers allocated to the SA-Preamble can be determined depending on the following equation.

$$SAPreambleCarrierSet_n = n+3\cdot k+40\cdot \frac{N_{SAP}}{144}+\mathrm{floor}\left(\frac{2\cdot k}{N_{SAP}}\right) \quad \text{[Equation 16]}$$

In Equation 16, $SAPreambleCarrierSet_n$ specifies all subcarriers allocated to the specific SA-Preamble. In Equation 16, n is a carrier set index indicating segment ID. Segment 0 uses carrier set 0, segment 1 uses carrier set 1, and segment 2 uses carrier set 2. $N_{SAP}$ denotes the number of subcarriers allocated for SA-Preamble, and has values of 144, 288 and 576 for 512-FFT, 1024-FFT and 2048-FFT. Also, k is a running index 0 to $N_{SAP}-1$ for each FFT size.

Idx can be determined according to the following equation.

$$Idx = 2 \cdot \mathrm{mod}(q, 128) + \mathrm{floor}\left(\frac{q}{128}\right)$$ [Equation 17]

In Equation 17, q is a running index 0 to 255. A SA-Preamble is usually divided into a plurality of sequence sub-blocks. In case of 512-FFT, the SA-Preamble of 288 bits is divided into eight sequence subblocks A, B, C, D, E, F, G and H each having a length of 36 bits, and then can be mapped into subcarriers. Each sequence subblock consists of 3 PRUs. In other words, each sequence subblock includes 54 subcarriers. Also, after A, B, C, D, E, F, G and H are sequentially modulated, they are mapped into the SA-Preamble subcarrier set corresponding to segment ID. In case of FFT greater than 512-FFT, basic subblocks A, B, C, D, E, F, G and H are repeated in the same order and then mapped into the SA-Preamble subcarrier set. For example, in case of 1024-FFT, E, F, G, H, A, B, C, D, E, F, G, H, A, B, C, and D are modulated and then sequentially mapped into the SA-Preamble subcarrier set. Each segment ID has different sequence subblocks. 256 sequences for sequence subblocks A, B, C, D, E, F, G and H are defined for each segment ID, and indexed by q from 0 to 255. Therefore, a sequence of subblocks A, B, C, D, E, F, G and H corresponding to a specific sequence index q of a specific segment ID can be identified from the 256 sequences for the specific segment ID.

Therefore, UE may derive a cell ID (IDcell) on the basis of a sub-block sequence of the SA-preamble and an SA-preamble carrier set index.

On the other hand, the UE may receive the UL frequency partition configuration (UFPC) information at step S1010b, and may configure one or more frequency partitions (FPs) according to the UFPC information. The UE may recognize the number of FPs and the size of each FP on the basis of the UFPC information.

On the other hand, the UE may determine an FFR pattern for the configured FP(s) from among the FFR patterns. The FFR pattern for use in each cell may be cell-specifically determined. For example, if four frequency partitions (FPs) are configured, each cell may select one of FFR patterns (Pattern 1, Pattern 2, and Pattern 3). In another example, if three FPs are configured and the FP3 size is not equal to zero (0), the FFR pattern for each cell may be selected from among the same patterns as the FFR pattern shown in FIG. 5.

The FFR pattern may be cell-specifically determined. BS may transmit information indicating an FFR pattern to be used by the UE to the UE. However, a UE of the cell may derive a cell ID (IDcell) from the SA-preamble, and may determine the FFR pattern according to the cell ID (IDcell). In addition, the FFR pattern for a specific ell may be determined according to the cell-specifically transmitted SA-preamble. For example, each cell adopts the FFR pattern corresponding to the pattern k decided by the following equation.

k=Segment_ID+1 [Equation 18]

For example, a UE having received the transmitted SA-preamble using Carrier Set 0 may determine Pattern 1 as an FFR pattern to be used by the UE. In this case, the BS need not additionally perform signaling of information for informing the UE of the FFR pattern.

The UE may determine frequency resources for the RCH according to any one of the first to third embodiments of the present invention using an IDcell and UL frequency partition configuration (UFPC) information at step S1020. According to the first embodiment of the present invention, the non-synchronized UE may determine frequency resources for NS-RCH according to Equations 4 and 6. The synchronized UE may determine frequency resources for S-RCH according to Equations 5 and 6. According to the second embodiment of the present invention, the non-synchronized UE may determine frequency resources for NS-RCH according to Equations 7 and 9, and the synchronized UE may determine frequency resources for S-RCH according to Equations 8 and 9. According to the third embodiment of the present invention, the non-synchronized UE may determine frequency resources for NS-RCH according to Equations 10 and 12, and the synchronized UE may determine frequency resources for S-RCH according to Equations 9 and 12.

The UE non-synchronized to the BS may transmit a ranging signal to the BS using the allocated NS-RCH at step S1030. The UE synchronized to the BS may transmit a ranging signal to the BS using the allocated S-RCH at step S1030.

The BS has already recognized an IDcell, a UFPC, and an FFR pattern, so that the BS can determine which one of frequency resources is used for RCH transmission. The BS may receive a ranging signal from the UE using the RCH allocated to the resource determined according to any one of the first to third embodiments of the present invention at step S1030.

The BS processor 400b may control the BS transmitter 100b for transmitting a preamble (for example, SA-preamble) carrying a cell ID (IDcell) serving as cell ID information at step S1010a. In addition, the BS processor 400b may determine UL frequency partition configuration (UFPC) for a specific cell, and may control the BS transmitter 100b to transmit UFPC information to UE(s) located at the specific cell at step S1010b. The BS 400b may control the BS transmitter 100b to broadcast UFPC through the SFH.

The UE receiver 300a may receive the above-mentioned preamble at step S1010a. The UE processor 400a may derive a cell ID (IDcell) from the above-mentioned preamble. For example, as can be seen from Equation 15 to 17, the UE processor 400a may acquire an IDcell on the basis of the SA-preamble sequence and the SA-preamble carrier set index.

On the other hand, the UE receiver 300a may receive UL frequency partition configuration (UFPC) information from the BS at step S1010b. The UE processor 400a may configure one or more FPs according to the UFPC information. For example, the UE processor 400a may allocate a resource unit (RU) to each frequency partition (FP) in accordance with the number of FPs indicated by the UFPC information and each FP size. For example, according to Tables 1 to 3, the UE processor 400a may recognize not only an FP(s) to which a resource unit (RU) is allocated from among FPs (FP0:FP1:FP2:FP3) but also the number of resource units (RUs) allocated to each FP on the basis of a DFPC. The UE processor 400a assigns no resource unit (i.e., 0 resource unit) to an FP having a value corresponding to zero (0) from among FPs (FP0:FP1:FP2:FP3). That is, the FP having a value corresponding to zero is not configured. The UE transmitter 100a may map PRUs to each FP under the control of the UE processor 400a.

On the other hand, the UE processor 400a may determine an FFR pattern for the configured FP(s) from among the FFR patterns. For example, if the BS transmits information indicating the FFR pattern, the UE processor 400a may determine different power levels of the FP(s) according to the indicated FFR pattern. In another example, the UE processor 400a may determine an FFR pattern on the basis of an IDcell or SA-preamble carrier set index. In the case where the FFR pattern is determined according to the SA-preamble carrier set index, the UE processor 400*a* may determine the FFR pattern according to Equation 18. Therefore, the UE processor 400*a* according to the embodiments of the present invention may determine which FP is the power-boosted reuse-1 partition from among the reuse-3 partitions.

The UE processor 400*a* may allocate frequency resources for RCH according to any one of the first to third embodiments of the present invention, using the IDcell and the frequency partition configuration information (i.e., UFPC) at step 1020. If the UE is not synchronized to the BS, the UE processor 400*a* according to the first embodiment of the present invention may allocate frequency resources for NS-RCH according to Equations 4 and 6. If the UE is synchronized with the BS, the UE processor 400*a* may allocate frequency resources for S-RCH according to Equations 5 and 6. If the UE is not synchronized to the BS, the UE processor 400*a* according to the second embodiment of the present invention may allocate frequency resources for NS-RCH according to Equations 7 and 9. If the UE is synchronized to the BS, the UE processor 400*a* may allocate frequency resources for S-RCH according to Equations 8 and 9. If the UE is synchronized to the BS, the UE processor 400*a* according to the third embodiment of the present invention may allocate frequency resources for NS-RCH according to Equations 10 and 12. If the UE is non-synchronized to the BS, the UE processor 400*a* may determine frequency resources for S-RCH according to Equations 9 and 12.

The UE processor 400*a* non-synchronized to the BS may control the UE transmitter 100*a* to transmit a ranging signal to the BS using the allocated NS-RCH at step S1030. The UE processor 400*a* synchronized to the BS may control the UE transmitter 100*a* to transmit a ranging signal to the BS using the allocated S-RCH at step S1030.

The BS processor 400*b* has already recognized an IDcell, a UFPC, and an FFR pattern for a specific cell, so that the BS processor 400*b* can recognize which one of frequency resources is used for RCH transmission by the UE located at the specific cell. According to any one of the first to third embodiments of the present invention, the BS processor 400*b* may determine frequency resources for RCH used for the ranging signal transmission of the UE. The BS processor 400*b* may control the BS receiver 300*b* to receive the ranging signal using the RCH allocated to the determined frequency resources. In the NS-RCH allocated to frequency resources determined by Equations 4 and 6 or in the S-RCH allocated to frequency resources determined by Equations 5 and 6, the BS processor 400*b* according to the first embodiment of the present invention may control the BS receiver 300*b* to receive the UE ranging signal. The BS processor 400*b* according to the second embodiment of the present invention may control the BS receiver 300*b* to receive the UE ranging signal in the NS-RCH allocated to frequency resources determined by Equations 7 and 9 or in the S-RCH allocated to frequency resources determined by Equations 8 and 9. The BS processor 400*b* according to the third embodiment of the present invention may control the BS receiver 300*b* to receive the UE ranging signal in the NS-RCH allocated to frequency resources determined by Equations 10 and 12 or in the S-RCH allocated to frequency resources determined by Equations 11 and 12.

According to the above-mentioned embodiments of the present invention, RCH may be allocated in a manner that interference affecting a consecutive cell is reduced. In addition, according to the embodiments of the present invention, it is prevented that too many UL control channels are concentrated and assigned to a specific FP, so that the probability of causing a shortage of data resources in the specific FP can be reduced. In conclusion, according to the embodiments of the present invention, an overall throughput of a communication system can be improved.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The embodiments of the present invention can be applied to a base station, a user equipment, or other communication devices in a wireless communication system.

What is claimed is:

1. A method for transmitting a ranging signal by a user equipment (UE) in a wireless communication system, the method comprising:

receiving frequency partition configuration information from a base station (BS);

determining a ranging channel (RCH) in a reuse-1 frequency partition, or in a power-boosted reuse-3 frequency partition only when there is no reuse-1 frequency partition, based on cell ID information (IDcell) of the BS and the frequency partition configuration information; and transmitting the ranging signal to the BS using the RCH, wherein the RCH is a non-synchronized ranging channel (NS-RCH) when the UE is not synchronized to the BS, and a frequency resource for the NS-RCH is determined according to Equation 1:

$$I_{SB} = \mathrm{mod}(\mathrm{IDcell}, R_{SB}) \qquad \text{[Equation 1]}$$

where $I_{SB}$ is a subband index (0, . . . , ($R_{SB}$−1)) for the NS-RCH from among $R_{SB}$ subbands, and $R_{SB}$ is determined by Equation 2:

$$R_{SB} = \frac{L_{SB\text{-}CRU,FP_i}}{4} \qquad \text{[Equation 2]}$$

where $L_{SB\text{-}CRU,FPi}$ is a number of subband contiguous resource units (CRUs) allocated to a frequency partition FPi, and FPi is corresponding to the reuse-1 frequency partition or corresponding to the power-boosted reuse-3 frequency partition only when there is no reuse-1 frequency partition.

2. The method according to claim 1, wherein:

the RCH is a synchronized ranging channel (S-RCH) when the UE is synchronized to the BS, and a frequency resource for the S-RCH is determined according to Equation 3:

$$I_{SB,s} = \mathrm{mod}(\mathrm{IDcell}+1, R_{SB}) \qquad \text{[Equation 3]}$$

where $I_{SB,s}$ is a subband index (0, . . . , ($R_{SB}$−1)) for the S-RCH from among $R_{SB}$ subbands.

3. A method for receiving a ranging signal by a base station (BS) in a wireless communication system, the method comprising:

transmitting frequency partition configuration information; and receiving the ranging signal from a user equipment (UE) using a ranging channel (RCH) in a reuse-1 frequency partition, or in a power-boosted reuse-3 frequency partition only when there is no reuse-1 frequency partition, based on cell ID information (IDcell) of the BS and the frequency partition configuration information, wherein the RCH is a non-synchronized ranging channel (NS-RCH) when the UE is not synchronized to the BS, and a frequency resource for the NS-RCH is determined according to Equation 1:

$$I_{SB}=\mathrm{mod}(\mathrm{IDcell},R_{SB}) \quad \text{[Equation 1]}$$

where $I_{SB}$ is a subband index $(0, \ldots, (R_{SB}-1))$ for the NS-RCH from among $R_{SB}$ subbands, and $R_{SB}$ is determined by Equation 2:

$$R_{SB} = \frac{L_{SB\text{-}CRU,FP_i}}{4} \quad \text{[Equation 4]}$$

where $L_{SB\text{-}CRU,FP_i}$ is a number of subband contiguous resource units (CRUs) allocated to a frequency partition FPi, and FPi is corresponding to the reuse-1 frequency partition or corresponding to the power-boosted reuse-3 frequency partition only when there is no reuse-1 frequency partition.

4. The method according to claim 3, wherein:
the RCH is a synchronized ranging channel (S-RCH) when the UE is synchronized to the BS, and a frequency resource for the S-RCH is determined according to Equation 3:

$$I_{SB,s}=\mathrm{mod}(\mathrm{IDcell}+1,R_{SB}) \quad \text{[Equation 3]}$$

where $I_{SB,s}$ is a subband index $(0, \ldots, (R_{SB}-1))$ for the S-RCH from among $R_{SB}$ subbands.

5. A user equipment (UE) for transmitting a ranging signal in a wireless communication system comprising:
a receiver;
a transmitter; and
a processor configured to control the receiver and the transmitter,
wherein the receiver is configured to receive frequency partition configuration information from a base station (BS), and
the processor determines a ranging channel (RCH) in a reuse-1 frequency partition, or in a power-boosted reuse-3 frequency partition only when there is no reuse-1 frequency partition, based on cell ID information (IDcell) of the BS and the frequency partition configuration information, and transmits the ranging signal to the BS using the RCH,
wherein the RCH is a non-synchronized ranging channel (NS-RCH) when the UE is not synchronized to the BS, and the processor is configured to determine a frequency resource for the NS-RCH according to Equation 1:

$$I_{SB}=\mathrm{mod}(\mathrm{IDcell},R_{SB}) \quad \text{[Equation 1]}$$

where $I_{SB}$ is a subband index $(0, \ldots, (R_{SB}-1))$ for the NS-RCH from among $R_{SB}$ subbands, and the processor is configured to determine $R_{SB}$ according to Equation 2:

$$R_{SB} = \frac{L_{SB\text{-}CRU,FP_i}}{4} \quad \text{[Equation 2]}$$

where $L_{SB\text{-}CRU,FP_i}$ is a number of subband contiguous resource units (CRUs) allocated to a frequency partition FPi, and FPi is corresponding to the reuse-1 frequency partition or corresponding to the power-boosted reuse-3 frequency partition only when there is no reuse-1 frequency partition.

6. The user equipment (UE) according to claim 5, wherein:
the RCH is a synchronized ranging channel (S-RCH) when the UE is synchronized to the BS, and the processor is configured to determine frequency resources for the S-RCH according to Equation 3:

$$I_{SB,s}=\mathrm{mod}(\mathrm{IDcell}+1,R_{SB}) \quad \text{[Equation 3]}$$

where $I_{SB,s}$ is a subband index $(0, \ldots, (R_{SB}-1))$ for the S-RCH from among $R_{SB}$ subbands.

7. A base station (BS) for receiving a ranging signal in a wireless communication system comprising:
a transmitter;
a receiver; and
a processor which controls the transmitter to transmit frequency partition configuration information, and controls the receiver to receive the ranging signal from a user equipment (UE) using a ranging channel (RCH) in a reuse-1 frequency partition, or in a power-boosted reuse-3 frequency partition only when there is no reuse-1 frequency partition, based on cell ID information (IDcell) of the BS and the frequency partition configuration information,
wherein the RCH is a non-synchronized ranging channel (NS-RCH) when the UE is not synchronized to the BS, and the processor is configured to determine a frequency resource for the NS-RCH according to Equation 1:

$$I_{SB}=\mathrm{mod}(\mathrm{IDcell},R_{SB}) \quad \text{[Equation 1]}$$

where $I_{SB}$ is a subband index $(0, \ldots, (R_{SB}-1))$ for the NS-RCH from among $R_{SB}$ subbands, and the processor is configured to determine $R_{SB}$ according to Equation 2:

$$R_{SB} = \frac{L_{SB\text{-}CRU,FP_i}}{4} \quad \text{[Equation 4]}$$

where $L_{SB\text{-}CRU,FP_i}$ is a number of subband contiguous resource units (CRUs) allocated to a frequency partition FPi, and FPi is corresponding to the reuse-1 frequency partition or corresponding to the power-boosted reuse-3 frequency partition only when there is no reuse-1 frequency partition.

8. The base station (BS) according to claim 7, wherein:
the RCH is a synchronized ranging channel (S-RCH) when the UE is synchronized to the BS, and the processor is configured to determine a frequency resource for the S-RCH according to Equation 3:

$$I_{SB,s}=\mathrm{mod}(\mathrm{IDcell}+1,R_{SB}) \quad \text{[Equation 3]}$$

where $I_{SB,s}$ is a subband index $(0, \ldots, (R_{SB}-1))$ for the S-RCH from among $R_{SB}$ subbands.

* * * * *